US012291039B2

(12) United States Patent
Haga et al.

(10) Patent No.: US 12,291,039 B2
(45) Date of Patent: May 6, 2025

(54) LIQUID EJECTION APPARATUS

(71) Applicant: SEIKO EPSON CORPORATION, Tokyo (JP)

(72) Inventors: Nanami Haga, Shiojiri (JP); Hiromichi Takanashi, Shiojiri (JP); Kenji Tsukada, Nagano (JP); Yuta Komatsu, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 133 days.

(21) Appl. No.: 18/357,284

(22) Filed: Jul. 24, 2023

(65) Prior Publication Data

US 2024/0025182 A1 Jan. 25, 2024

(30) Foreign Application Priority Data

Jul. 25, 2022 (JP) ................................ 2022-117930

(51) Int. Cl.
*B41J 2/175* (2006.01)
*B41J 2/17* (2006.01)
*B41J 2/18* (2006.01)

(52) U.S. Cl.
CPC ......... *B41J 2/17596* (2013.01); *B41J 2/1707* (2013.01); *B41J 2/18* (2013.01)

(58) Field of Classification Search
CPC ........ B41J 29/38; B41J 2/17509; B41J 2/175; B41J 2/17596; B41J 2/18; B41J 29/13; B41J 2/1707
See application file for complete search history.

(56) References Cited

U.S. PATENT DOCUMENTS

| | | | | |
|---|---|---|---|---|
| 11,007,786 | B2 * | 5/2021 | Tokisawa | B41J 2/16517 |
| 11,179,947 | B2 * | 11/2021 | Tsukada | B41J 2/195 |
| 11,618,260 | B2 * | 4/2023 | Shinoda | B41J 2/16544 347/33 |
| 12,194,754 | B2 * | 1/2025 | Haga | B41J 2/18 |
| 2022/0016898 | A1 | 1/2022 | Sakai et al. | |

FOREIGN PATENT DOCUMENTS

| | | | |
|---|---|---|---|
| JP | 2007008117 | A | 1/2007 |
| JP | 2022018221 | A | 1/2022 |

* cited by examiner

*Primary Examiner* — An H Do
(74) *Attorney, Agent, or Firm* — CHIP LAW GROUP

(57) ABSTRACT

A liquid ejection apparatus includes a first storage portion capable of storing a liquid supplied from a liquid container, a first open-to-atmosphere channel configured to open the inside of the first storage portion to the atmosphere, a second storage portion capable of storing the liquid supplied from the first storage portion, and a second open-to-atmosphere channel configured to open the inside of the second storage portion to the atmosphere. The liquid ejection apparatus is configured to select either a normal mode or a transport mode. The normal mode is a mode in which the power is switched off with the first open-to-atmosphere channel open and the second open-to-atmosphere channel open. The transport mode is a mode in which the power is switched off with the first open-to-atmosphere channel open and the second open-to-atmosphere channel closed.

10 Claims, 13 Drawing Sheets

| MODE | FIRST STORAGE PORTION | SECOND STORAGE PORTION |
|---|---|---|
| NORMAL MODE | OPEN | OPEN |
| TRANSPORT MODE | OPEN | CLOSED |

LIQUID EJECTION APPARATUS

The present application is based on, and claims priority from JP Application Serial Number 2022-117930, filed Jul. 25, 2022, and 2022-120254, filed Jul. 28, 2022, the disclosures of which are hereby incorporated by reference herein in their entirety.

BACKGROUND

1. Technical Field

The disclosure relates to a liquid ejection apparatus.

2. Related Art

There is a liquid ejection apparatus for performing printing on a medium by ejecting a liquid from a liquid ejection portion, for example, as disclosed in JP-A-2022-18221. The liquid ejection apparatus described in JP-A-2022-18221 includes a first storage portion capable of storing a liquid supplied from a liquid container, a second storage portion capable of storing the liquid supplied from the first storage portion, and a check valve that permits a flow of the liquid from the first storage portion toward the second storage portion. The liquid contained in the liquid container is supplied from the first storage portion to the second storage portion and then supplied from the second storage portion to the liquid ejection portion.

The liquid ejection apparatus described in JP-A-2022-18221 performs control such that the inside of the first storage portion is openable to the atmosphere by opening a first open-to-atmosphere channel and the inside of the second storage portion is openable to the atmosphere by opening a second open-to-atmosphere channel.

However, when a liquid is stored in the first storage portion in such a liquid ejection apparatus, vibration or the like generated during transport, for example, causes the liquid in the first storage portion to undulate, and thus the liquid in the first storage portion may be unintentionally supplied to the second storage portion. The liquid supplied to the second storage portion will not be supplied back to the first storage portion because of the check valve. As a result, the liquid level in the second storage portion may become higher than expected.

SUMMARY

A liquid ejection apparatus to solve the above-described problem includes a first storage portion configured to store a liquid supplied from a liquid container, a first open-to-atmosphere channel configured to open an inside of the first storage portion to the atmosphere, a first valve configured to open and close the first open-to-atmosphere channel, a second storage portion configured to store the liquid supplied from the first storage portion, a second open-to-atmosphere channel configured to open an inside of the second storage portion to the atmosphere, a second valve configured to open and close the second open-to-atmosphere channel, a check valve configured to permit a flow of the liquid from the first storage portion to the second storage portion and restrict a flow of the liquid from the second storage portion to the first storage portion, and a liquid ejection portion configured to eject at least the liquid supplied from the second storage portion, in which a normal mode and a transport mode are selectable, the normal mode is a mode in which power is switched off with the first open-to-atmosphere channel opened by the first valve and the second open-to-atmosphere channel opened by the second valve, and the transport mode is a mode in which power is switched off with the first open-to-atmosphere channel opened by the first valve and the second open-to-atmosphere channel closed by the second valve.

DESCRIPTION OF EXEMPLARY EMBODIMENTS

First Embodiment

Figure 1:
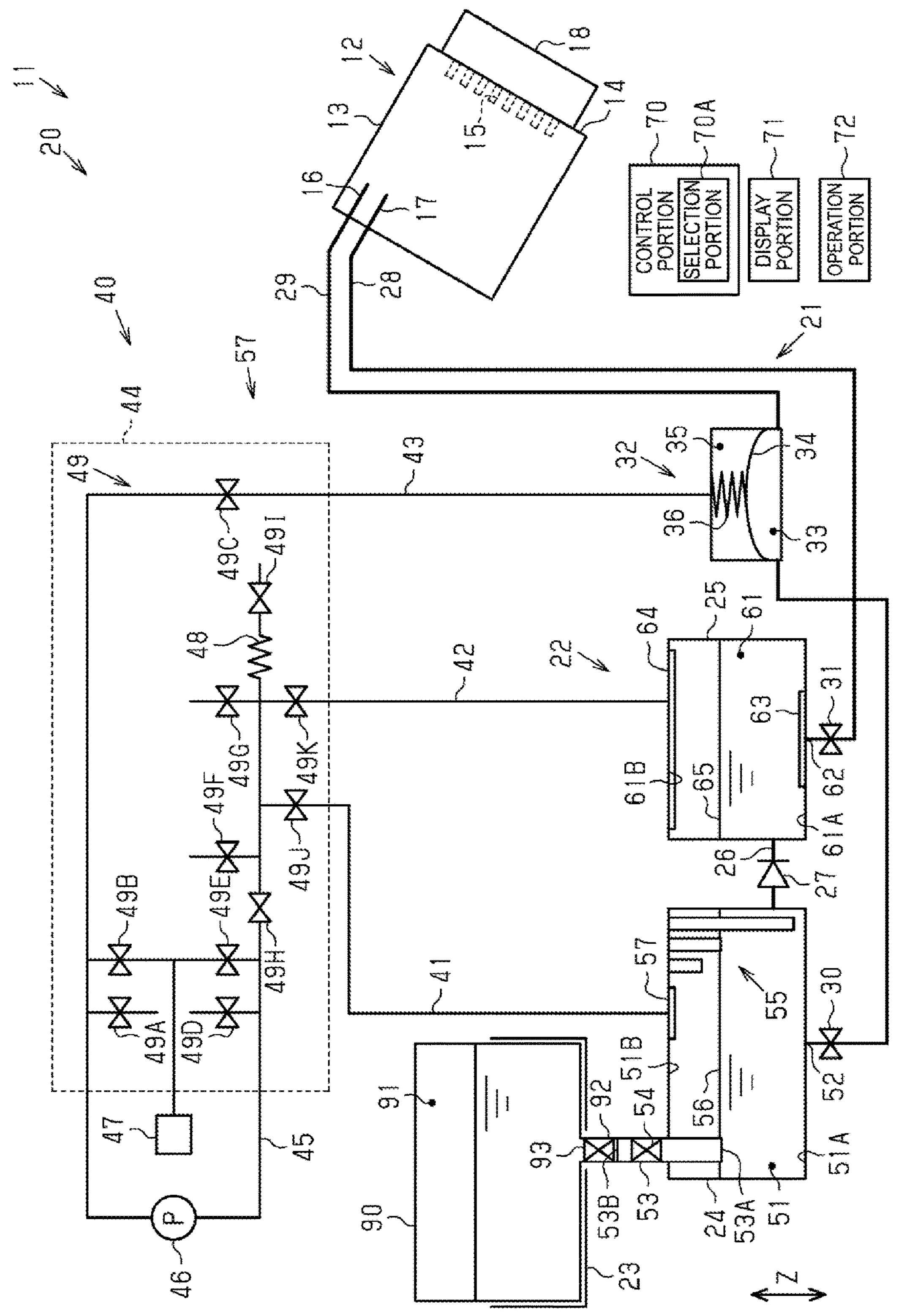
FIG. 1 is a schematic diagram of a liquid ejection apparatus.

Exemplary embodiments of a liquid ejection apparatus will be described below with reference to the accompanying drawings. In the drawings, the z axis represents the direction of gravity on the assumption that a liquid ejection apparatus is placed on a horizontal plane.

Liquid Ejection Apparatus 11

A liquid ejection apparatus 11 is configured to perform printing by ejecting a liquid onto a medium as illustrated in FIG. 1. The liquid ejection apparatus 11 may be, for example, an ink-jet printer that ejects ink, which is an example of a liquid, to perform printing. The medium may be, for example, paper, fabric, vinyl, a plastic part, a metal part, or the like. The liquid ejection apparatus 11 may be a multifunction printer equipped with a scanner function of reading images.

Liquid Ejection Portion 12

The liquid ejection apparatus 11 includes a liquid ejection portion 12. The liquid ejection portion 12 can eject a liquid. The liquid ejection portion 12 is configured to eject a liquid onto a medium to perform printing thereon.

The liquid ejection portion 12 includes a liquid ejection head 13. The liquid ejection head 13 includes a nozzle surface 14 and a plurality of nozzles 15. Each of the plurality of nozzles 15 is provided to open to the nozzle surface 14. The liquid ejection head 13 can eject a liquid from each of the plurality of nozzles 15.

Although the liquid ejection portion 12 of the embodiment is of a line type, it may be of a serial type. In the case of a line type, the liquid ejection head 13 is provided in the width direction of a medium. In the case of a serial type, printing is performed while the liquid ejection head 13 moves in the width direction of a medium.

The liquid ejection head 13 may include a first coupling portion 16 and a second coupling portion 17. The first coupling portion 16 is coupled to a recovery channel 29 to be described later. The second coupling portion 17 is coupled to a supply channel 28 to be described later.

The liquid ejection head 13 may be disposed such that the nozzle surface 14 has an inclined posture in which it is inclined with respect to the horizontal direction. The liquid ejection head 13 may eject a liquid onto a medium in the inclined posture to perform printing. The first coupling portion 16 may be disposed at a position higher than the second coupling portion 17.

Maintenance Portion 18

The liquid ejection apparatus 11 includes a maintenance portion 18. The maintenance portion 18 performs maintenance operations for the liquid ejection head 13. The maintenance operations may include wiping, flushing, and idle suction. Wiping is to remove the liquid adhering to the nozzle surface 14. Flushing is performed by ejecting the liquid from each of the plurality of nozzles 15 to the maintenance portion 18. Idle suction is to discharge the liquid accumulated in the maintenance portion 18 to a discharge tank, which is not illustrated.

Supply Device 20

The liquid ejection apparatus 11 includes a supply device 20. The supply device 20 is configured to supply the liquid contained in a liquid container 90 to the liquid ejection portion 12. The supply device 20 may be configured to circulate the liquid from the liquid ejection portion 12.

The supply device 20 may include a supply mechanism 21 of a single system or supply mechanisms 21 of multiple systems. The supply mechanisms 21 of multiple systems may supply different types of liquids to the liquid ejection portion 12. For example, the liquid ejection apparatus 11 may perform color printing by ejecting liquids of multiple colors supplied by the supply mechanisms 21 of the multiple systems. Although the liquid ejection apparatus 11 performs color printing by ejecting the four types of liquids of cyan, magenta, yellow, and black in the embodiment, the present disclosure is not limited thereto. Hereinafter, a representative supply mechanism 21 of a single system among the supply mechanisms 21 of the multiple systems will be described.

Tank Unit 22

The supply mechanism 21 includes a tank unit 22. The tank unit 22 is configured to lead the liquid supplied from the liquid container 90 out to the liquid ejection portion 12. The tank unit 22 may include a mounting portion 23. The liquid container 90 is configured to be attachable to and detachable from the mounting portion 23.

The liquid container 90 may be attachable to the mounting portion 23 to support each of the supply mechanisms 21 of the multiple systems. The liquid container 90 may include a containing chamber 91. The containing chamber 91 is configured to store a liquid. The containing chamber 91 is a sealed space not communicating with the atmosphere. The containing chamber 91 may be capable of storing a larger amount of liquid than the amount of liquid held by the supply device 20.

The liquid container 90 may include a lead-out portion 92. The lead-out portion 92 is configured to lead out the liquid stored in the containing chamber 91. The lead-out portion 92 may include a lead-out valve 93. The lead-out valve 93 is configured to open when the liquid container 90 is mounted on the mounting portion 23. The lead-out valve 93 maintains an open state while the liquid container 90 is mounted on the mounting portion 23.

The tank unit 22 includes a first storage portion 24. The first storage portion 24 is capable of storing the liquid supplied from the liquid container 90. The first storage portion 24 functions as a sub-tank that temporarily stores the liquid.

The tank unit 22 includes a second storage portion 25. The second storage portion 25 is capable of storing the liquid supplied from the first storage portion 24. The second storage portion 25 functions as a reservoir tank that temporarily stores the liquid lead out from the first storage portion 24 before it is supplied to the liquid ejection portion 12.

The tank unit 22 includes a lead-out channel 26. The lead-out channel 26 is configured such that the first storage portion 24 and the second storage portion 25 communicate with each other therethrough. The first storage portion 24 is positioned upstream of the second storage portion 25 in a liquid flow direction in which a liquid is supplied from the liquid container 90 to the liquid ejection portion 12.

The tank unit 22 includes an on-off valve 27. The on-off valve 27 is provided in the lead-out channel 26. The on-off valve 27 can open and close the lead-out channel 26. The on-off valve 27 includes one or more check valves. The check valve allows the liquid to flow from the first storage portion 24 toward the second storage portion 25 and restricts the liquid flowing from the second storage portion 25 toward the first storage portion 24. The liquid ejection apparatus 11 includes the check valve as described above. The on-off valve 27 closes the lead-out channel 26 when pressure inside the second storage portion 25 is higher than pressure inside the first storage portion 24.

The supply mechanisms 21 include the supply channel 28. The supply channel 28 supplies a liquid from the second storage portion 25 to the liquid ejection portion 12. The supply channel 28 has an upstream end coupled to the second storage portion 25 and a downstream end coupled to the second coupling portion 17.

The supply mechanisms 21 include the recovery channel 29. The recovery channel 29 recovers the liquid from the liquid ejection portion 12 to the first storage portion 24. The recovery channel 29 has an upstream end coupled to the first coupling portion 16 and a downstream end coupled to the first storage portion 24.

The supply mechanisms 21 include a first channel valve 30 and a second channel valve 31. The first channel valve 30 is provided at the recovery channel 29. The first channel valve 30 can open and close the recovery channel 29. The second channel valve 31 is provided at the supply channel 28. The second channel valve 31 can open and close the supply channel 28.

Micro-Pressurization Unit 32

The supply mechanisms 21 may include a micro-pressurization unit 32. The micro-pressurization unit 32 may be provided between the liquid ejection portion 12 and the first channel valve 30 on the recovery channel 29. The micro-pressurization unit 32 pressurizes the liquid inside the recovery channel 29. The micro-pressurization unit 32 includes a liquid chamber 33, a flexible member 34, an air chamber 35, and a spring 36. The liquid chamber 33 is provided between the liquid ejection portion 12 and the second channel valve 31 on the recovery channel 29. The liquid chamber 33 is configured to store the liquid on the recovery channel 29. A part of the liquid chamber 33 is constituted by the flexible member 34. The volume of the liquid chamber 33 changes as the flexible member 34 is deformed.

The flexible member 34 is configured to compartmentalize the liquid chamber 33 and the air chamber 35. The flexible member 34 is deformable in response to pressure from the air chamber 35. The air chamber 35 is configured to be coupled to an air channel 43 to be described later. The spring 36 is provided in the air chamber 35. The spring 36 presses the flexible member 34 to reduce pressure fluctuations of the liquid in the recovery channel 29 and the liquid ejection portion 12.

Drive Mechanism 40

The supply device 20 includes a drive mechanism 40. The drive mechanism 40 drives the supply mechanisms 21. Specifically, the drive mechanism 40 drives the tank unit 22 and the micro-pressurization unit 32. Although the drive mechanism 40 drives the individual supply mechanisms 21 of the multiple systems, the driving mechanism 40 may collectively drive the supply mechanisms 21 of the multiple systems.

The drive mechanism 40 includes a first open-to-atmosphere channel 41, a second open-to-atmosphere channel 42, and an air channel 43. The first open-to-atmosphere channel 41 is coupled to the first storage portion 24. The first open-to-atmosphere channel 41 can open the inside of the first storage portion 24 to the atmosphere. The second open-to-atmosphere channel 42 is coupled to the second storage portion 25. The second open-to-atmosphere channel 42 can open the inside of the second storage portion 25 to the atmosphere. The air channel 43 is coupled to the micro-pressurization unit 32.

The drive mechanism 40 may include a switching mechanism 44, a coupling channel 45, a pressurization portion 46, and a pressure sensor 47. The switching mechanism 44 may be a selector valve that controls opening and closing of the first open-to-atmosphere channel 41, the second open-to-atmosphere channel 42, and the air channel 43. The coupling channel 45 is configured to couple the first open-to-atmosphere channel 41 and the second open-to-atmosphere channel 42 to the pressurization portion 46.

The pressurization portion 46 is configured to adjust the pressure of the tank unit 22 and the micro-pressurization unit 32. The pressurization portion 46 may be, for example, a tube pump in which a roller rotates and sends out air while crushing a tube.

The pressurization portion 46 is coupled to the switching mechanism 44. Specifically, one end of the pressurization portion 46 is coupled to the air channel 43, and the other end thereof is coupled to the coupling channel 45. When the pressurization portion 46 is driven forward, the air taken from the air channel 43 is sent to the coupling channel 45. The pressurization portion 46 reduces the pressure inside the air chamber 35 when being driven backward.

The pressure sensor 47 is coupled to the switching mechanism 44. The pressure sensor 47 detects a pressure.

First Storage Portion 24

Here, the first storage portion 24 will be described in detail.

The first storage portion 24 includes a first storage chamber 51. The first storage chamber 51 is configured to store a liquid. The first storage portion 24 includes an inflow port 52. The inflow port 52 is an opening through which the liquid inside the recovery channel 29 flows into the first storage chamber 51. The inflow port 52 may be an opening through which the liquid stored in the first storage chamber 51 is supplied to the recovery channel 29. The inflow port 52 may be provided below the center of the first storage chamber 51 in the vertical direction Z, or may be provided to penetrate a bottom 51A of the first storage chamber 51. In this way, the first storage chamber 51 communicates with the recovery channel 29 through the inflow port 52.

The first storage portion 24 includes a lead-in portion 53. The lead-in portion 53 is configured to introduce the liquid contained in the liquid container 90 mounted on the mounting portion 23. The lead-in portion 53 is provided in an upper portion of the first storage portion 24. The lead-in portion 53 of the embodiment is provided to penetrate a ceiling 51B of the first storage chamber 51. A lower end 53A of the lead-in portion 53 is positioned below the ceiling 51B in the first storage chamber 51. An upper end 53B of the lead-in portion 53 is positioned above the ceiling 51B outside the first storage chamber 51. The lead-in portion 53 is coupled to the lead-out portion 92 included in the liquid container 90 when the liquid container 90 is mounted on the mounting portion 23. The lower end 53A of the lead-in portion 53 may be positioned below the nozzle surface 14.

The lead-in portion 53 includes an introduction valve 54. The introduction valve 54 is configured to open when the liquid container 90 is mounted on the mounting portion 23. The introduction valve 54 maintains an open state while the liquid container 90 is mounted on the mounting portion 23. The introduction valve 54 is configured to open before the lead-out valve 93 opens when the liquid container 90 is mounted on the mounting portion 23. Thus, this configuration can reduce the risk of liquid leaking from the liquid container 90.

The first storage portion 24 may include a liquid amount sensor 55. The liquid amount sensor 55 detects the amount of liquid stored in the first storage chamber 51. Specifically, the liquid amount sensor 55 detects a first liquid level 56 of the liquid stored in the first storage chamber 51. The liquid amount sensor 55 may detect the first liquid level 56 being at the standard position, the first liquid level 56 being below the standard position, and the first liquid level 56 being at the full position.

The standard position in the embodiment is positioned above the position of the inflow port 52 in the first storage chamber 51. Therefore, when the first liquid level 56 is at the standard position, the liquid stored in the first storage chamber 51 can be supplied to the liquid ejection portion 12 through the recovery channel 29. The full position is a position higher than the standard position.

The first storage portion 24 may include a first gas-liquid separation membrane 57. The first gas-liquid separation membrane 57 is provided on the ceiling 51B of the first storage chamber 51 at a position at which the first storage chamber 51 is separated from the first open-to-atmosphere channel 41. The first gas-liquid separation membrane 57 is a membrane having features of allowing a gas to pass therethrough and not allowing a liquid to pass therethrough. The first gas-liquid separation membrane 57 suppresses the liquid that is stored in the first storage chamber 51 flowing to the drive mechanism 40 through the first open-to-atmosphere channel 41.

Second Storage Portion 25

Next, a second storage portion 25 will be described in detail.

The second storage portion 25 includes a second storage chamber 61. The second storage chamber 61 is configured to store a liquid. The second storage portion 25 includes a supply port 62. The supply port 62 is an opening through which the liquid stored in the second storage chamber 61 is supplied to the supply channel 28. The supply port 62 may be provided below the center of the second storage chamber 61 in the vertical direction Z, or may be provided to penetrate a bottom 61A of the second storage chamber 61. In this way, the second storage chamber 61 communicates with the supply channel 28 through the supply port 62. The second storage portion 25 includes a filter 63. The filter 63 is positioned in the second storage chamber 61. The filter 63 covers the supply port 62.

The second storage portion 25 may include a second gas-liquid separation membrane 64. The second gas-liquid separation membrane 64 is provided on a ceiling 61B of the second storage chamber 61 at a position at which the second storage chamber 61 is separated from the second open-to-atmosphere channel 42. The second gas-liquid separation membrane 64 is a membrane having features of allowing a gas to pass therethrough, and not allowing a liquid to pass therethrough. The second gas-liquid separation membrane 64 suppresses the liquid that is stored in the second storage chamber 61 flowing to the drive mechanism 40 through the second open-to-atmosphere channel 42.

Liquid Supply to Tank Unit 22

Here, liquid supply to the tank unit 22 will be described.

When the liquid container 90 is mounted on the mounting portion 23, the water head difference causes the liquid in the liquid container 90 to be supplied to the first storage portion 24. Air is introduced from the first storage portion 24 to the liquid container 90 through the lead-in portion 53 and the lead-out portion 92 by the amount of liquid supplied from the liquid container 90 to the first storage portion 24. The first liquid level 56 rises by the amount of the liquid supplied from the liquid container 90 to the first storage portion 24.

When the first liquid level 56 reaches the lower end 53A of the lead-in portion 53, inflow of air from the first storage portion 24 to the liquid container 90 is restricted. Since the containing chamber 91 is sealed, when inflow of air from the first storage portion 24 to the liquid container 90 is restricted, the pressure inside the containing chamber 91 decreases by the amount of the liquid supplied to the first storage portion 24. When the negative pressure inside the containing chamber 91 becomes greater than the water head of the liquid inside the containing chamber 91, supply of liquid from the liquid container 90 to the first storage portion 24 is restricted.

In addition, in a case in which the inside of the first storage chamber 51 and the inside of the second storage chamber 61 are open to the atmosphere, when the first liquid level 56 is higher than the second liquid level 65 of the liquid inside the second storage portion 25, the water head difference causes the on-off valve 27 to open. Accordingly, the liquid stored in the first storage portion 24 is supplied to the second storage portion 25 through the lead-out channel 26. Then, as a result of the second liquid level 65 rising by the amount of the supplied liquid and the first liquid level 56 dropping by the amount of the supplied liquid, the second liquid level 65 comes to have the same height as the first liquid level 56. When the first liquid level 56 and the second liquid level 65 have the same height, the on-off valve 27 is closed. Thus, the first liquid level 56 and the second liquid level 65 are kept at the same height.

The first liquid level 56 is lowered when the liquid is supplied from the first storage portion 24 to the second storage portion 25. When the first liquid level 56 is lowered and air flows into the containing chamber 91 through the lead-in portion 53 and the lead-out portion 92, the negative pressure inside the containing chamber 91 decreases. When the negative pressure inside the containing chamber 91 becomes lower than the water head of the liquid inside the containing chamber 91, the liquid is supplied from the liquid container 90 to the first storage portion 24. Therefore, while the liquid is contained in the liquid container 90, the first liquid level 56 is kept at the standard position which is a position near the lower end 53A of the lead-in portion 53. In addition, the second liquid level 65 has the same height as the first liquid level 56, and is kept at the standard position.

Accordingly, the first liquid level 56 and the second liquid level 65 fluctuate in a range lower than the nozzle surface 14. The liquid inside the liquid ejection head 13 is maintained at a negative pressure due to the water head difference between the liquid in the first storage portion 24 and the liquid in the second storage portion 25. When the liquid is consumed by the liquid ejection head 13, the liquid stored in the second storage portion 25 is supplied to the liquid ejection head 13.

Switching Mechanism 44

Next, the switching mechanism 44 will be described in detail.

The switching mechanism 44 includes a thin tube portion 48. The thin tube portion 48 is provided on the coupling channel 45. The thin tube portion 48 is a serpentine tube that is thin enough to significantly restrict a flow of liquid, compared to the flow of air.

The switching mechanism 44 includes a plurality of selector valves 49. Specifically, the switching mechanism 44 includes a first selector valve 49A to an eleventh selector valve 49K. Each of the plurality of selector valves 49A to 49K is configured to open and close a channel.

The first selector valve 49A is opened to allow the air channel 43 to communicate with the atmosphere. The second selector valve 49B is opened to allow the air channel 43 to communicate with the pressure sensor 47. The third selector valve 49C is opened to open the air channel 43, thereby allowing the pressurization portion 46 to communicate with the air chamber 35.

The fourth selector valve 49D is opened to allow the coupling channel 45 between the pressurization portion 46 and the eighth selector valve 49H to communicate with the atmosphere. The fifth selector valve 49E is opened to allow the coupling channel 45 to communicate with the pressure sensor 47. The sixth selector valve 49F and the seventh selector valve 49G are opened to allow the coupling channel 45 to communicate with the atmosphere. The eighth selector valve 49H is opened to open the coupling channel 45. The ninth selector valve 49I is opened to allow the thin tube portion 48 to communicate with the atmosphere. The tenth selector valve 49J is opened to open the first open-to-atmosphere channel 41 to allow the first storage portion 24 to communicate with the coupling channel 45. The eleventh selector valve 49K is opened to open the second open-to-atmosphere channel 42 to allow the second storage portion 25 to communicate with the coupling channel 45.

When the pressure inside the air chamber 35 is changed, the switching mechanism 44 opens the second selector valve 49B to the fourth selector valve 49D and closes the other selector valves. If the pressurization portion 46 is driven forward in this state, the air inside the air chamber 35 is discharged through the air channel 43 and the coupling channel 45, and the pressure inside the air chamber 35 becomes lower. If the pressurization portion 46 is driven backward or the inside of the air channel 43 and the inside of the air chamber 35 are open to the atmosphere, air is sent into the air chamber 35 through the coupling channel 45 and the air channel 43 or the air channel 43, causing the pressure inside the air chamber 35 to increase. At this time, the pressure sensor 47 may detect the pressure inside the air channel 43 and the air chamber 35.

When the first storage portion 24 is to be open to the atmosphere, the switching mechanism 44 opens the sixth selector valve 49F and the tenth selector valve 49J. The first storage chamber 51 communicates with the atmosphere through the first open-to-atmosphere channel 41 and the coupling channel 45. In this way, the sixth selector valve 49F and the tenth selector valve 49J can open and close the first open-to-atmosphere channel 41.

When the second storage portion 25 is to be open to the atmosphere, the switching mechanism 44 opens the seventh selector valve 49G and the eleventh selector valve 49K. The second storage chamber 61 communicates with the atmosphere through the second open-to-atmosphere channel 42 and the coupling channel 45. In this way, the seventh selector valve 49G and the eleventh selector valve 49K can open and close the second open-to-atmosphere channel 42.

In the embodiment, the sixth selector valve 49F and the tenth selector valve 49J correspond to an example of a first valve. In the embodiment, the seventh selector valve 49G and the eleventh selector valve 49K correspond to an example of a second valve.

When the inside of the first storage portion 24 is to be pressurized, the switching mechanism 44 opens the first selector valve 49A, the fifth selector valve 49E, the eighth selector valve 49H, and the tenth selector valve 49J, and closes the other selector valves. If the pressurization portion 46 is driven forward in that state, air flows into the first storage chamber 51 through the air channel 43, the coupling channel 45, and the first open-to-atmosphere channel 41, and the pressure inside the first storage chamber 51 increases. At this time, the pressure sensor 47 may detect the pressure inside the coupling channel 45, the first open-to-atmosphere channel 41, and the first storage chamber 51.

When the inside of the second storage portion 25 is to be pressurized, the switching mechanism 44 opens the first selector valve 49A, the fifth selector valve 49E, the eighth selector valve 49H, and the eleventh selector valve 49K, and closes the other selector valves. If the pressurization portion 46 is driven forward in that state, air flows into the second storage chamber 61 through the air channel 43, the coupling channel 45, and the second open-to-atmosphere channel 42, and the pressure inside the second storage chamber 61 increases. At this time, the pressure sensor 47 may detect the pressure inside the coupling channel 45, the second open-to-atmosphere channel 42, and the second storage chamber 61.

Control Portion 70

The liquid ejection apparatus 11 includes a control portion 70. The control portion 70 controls various operations performed in the liquid ejection apparatus 11. The control portion 70 may be configured as a circuit including a: one or more processors that perform various processing operations according to a computer program, one or more dedicated hardware circuits that perform at least some of the various processing operations, or y: a combination thereof. One of the hardware circuits are, for example, an application-specific integrated circuit. One of the processors includes a CPU and a memory such as a RAM and a ROM, which stores program codes or instructions configured to cause the CPU to perform processing. The memory, that is, a computer-readable medium, includes any readable medium that can be accessed by a general-purpose or dedicated computer.

The liquid ejection apparatus 11 may include a display portion 71 and an operation portion 72. The display portion 71 is configured to display information about the liquid ejection apparatus 11. The operation portion 72 is configured to be operable by an operator such as a user or a serviceperson. The operation portion 72 is, for example, a touch panel for performing operations related to the liquid ejection apparatus 11.

The control portion 70 controls the liquid ejection portion 12. The control portion 70 controls opening and closing of the first channel valve 30 and the second channel valve 31. The control portion 70 receives a detection signal indicating a detection result of the liquid amount sensor 55 from the liquid amount sensor 55. The control portion 70 controls the switching mechanism 44 and the pressurization portion 46. The control portion 70 receives a detection signal indicating a detection result of the pressure sensor 47 from the pressure sensor 47. The control portion 70 causes the display portion 71 to display information. The control portion 70 receives an operation signal based on an operation of the operation portion 72 from the operation portion 72.

Each Function of Control Portion

When the first storage portion 24 and the second storage portion 25 are filled with a liquid, the control portion 70 closes the first channel valve 30 and the second channel valve 31 to open the inside of the first storage portion 24 and the inside of the second storage portion 25 to the atmosphere. Accordingly, the liquid is supplied from the liquid container 90 mounted on the mounting portion 23 to the first storage portion 24, and thereby the first storage portion 24 is filled with the liquid. Then, the liquid is supplied from the first storage portion 24 to the second storage portion 25, and thereby the second storage portion 25 is filled with the liquid.

When the liquid ejection apparatus 11 is involved with printing, the control portion 70 opens the first channel valve 30 and the second channel valve 31 to open the inside of the first storage portion 24 and the inside of the second storage portion 25 to the atmosphere. As a result, the liquid is supplied from the second storage portion 25 to the liquid ejection portion 12 through the supply channel 28, and the liquid is supplied from the first storage portion 24 to the liquid ejection portion 12 through the recovery channel 29 during printing. In addition, the control portion 70 may close the first channel valve 30 when printing is performed by the liquid ejection apparatus 11. In this manner, the liquid ejection portion 12 can eject at least the liquid supplied from the second storage portion 25.

The control portion 70 may close the first channel valve 30 and the second channel valve 31 when printing is not performed by the liquid ejection apparatus 11. By closing the supply channel 28 and the recovery channel 29 in this way, leakage of the liquid from the liquid ejection head 13 can be avoided even when vibration, impact, or the like is imparted to the liquid ejection apparatus 11, for example.

The control portion 70 can enable liquid circulation. Liquid circulation may be performed, for example, in a standby mode in which printing or the like is not performed or may be performed during printing. When liquid circulation is performed, the control portion 70 opens the first channel valve and the second channel valve 31 to open the inside of the first storage portion 24 to the atmosphere and to pressurize the inside of the second storage portion 25. As a result, the liquid is supplied from the second storage portion 25 to the liquid ejection portion 12 through the supply channel 28, and a liquid is recovered from the liquid ejection portion 12 to the first storage portion 24 through the recovery channel 29 during liquid circulation.

The control portion 70 can perform pressurized discharge. Pressurized discharge is performed when ejection failure occurs. Ejection failure is failure in which a liquid cannot be normally ejected from each of the plurality of nozzles When pressurization discharge is performed, the control portion 70 closes the first channel valve 30 and opens the second channel valve 31 to pressurize the inside of the second storage portion 25. As a result, the liquid can be discharged from each of the plurality of nozzles 15 through the second storage portion 25 and the supply channel 28 during the pressurized discharge.

The control portion 70 can perform micro-pressurized discharge. When micro-pressurized discharge is performed, the control portion 70 opens the first channel valve 30 and the second channel valve 31 to reduce the pressure inside the air chamber 35. Then, after closing the first channel valve 30 and the second channel valve 31, the control portion 70 opens the air chamber 35 to the atmosphere. Accordingly, the liquid can be discharged from each of the plurality of nozzles 15 through the micro-pressurization unit 32 and the recovery channel 29 during the micro-pressurized discharge. The amount of liquid discharged from the liquid ejection head 13 due to the micro-pressurized discharge is smaller than the amount of liquid discharged from the liquid ejection head 13 due to pressurized discharge.

When the liquid amount sensor 55 detects that the first liquid level 56 is positioned lower than the standard position, the control portion 70 may determine that the liquid container is empty and instruct the user to replace the liquid container 90.

Selection Portion

The control portion 70 includes a selection portion 70A. The selection portion 70A is configured to select a mode of the liquid ejection apparatus 11. Modes include a normal mode and a transport mode. That is, the selection portion 70A is configured to select any one of the normal mode or the transport mode.

The transport mode is different from the normal mode. The transport mode is a mode set when the liquid ejection apparatus 11 is transported, for example, in a case in which the liquid ejection apparatus 11 is transported in a vehicle while a liquid is stored in the tank unit 22.

Figures 2, 3:
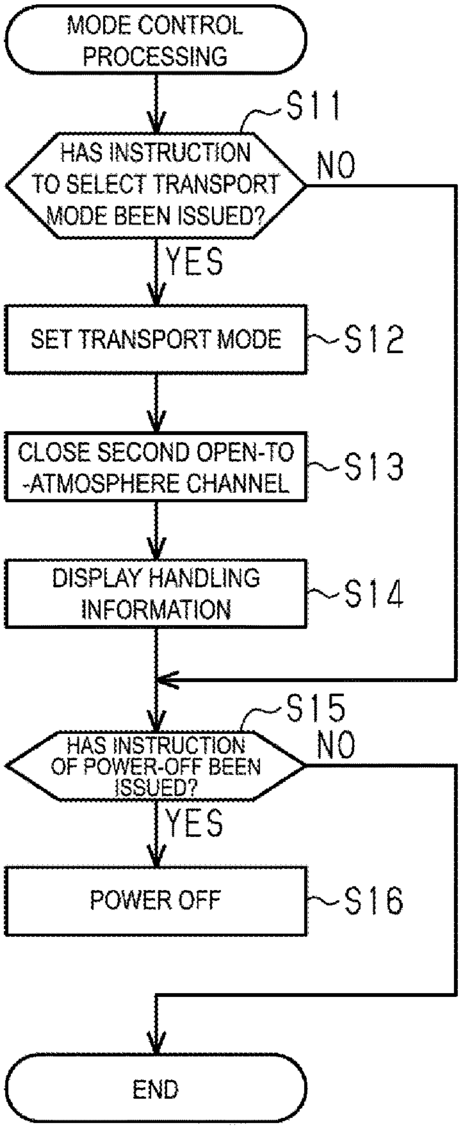
FIG. 2 is a schematic diagram illustrating modes of the liquid ejection apparatus.
FIG. 3 is a flowchart illustrating mode control processing.

The normal mode is a mode in which power is switched off with the first open-to-atmosphere channel 41 open and the second open-to-atmosphere channel 42 open as illustrated in FIG. 2. On the other hand, the transport mode is a mode in which power is switched off with the first open-to-atmosphere channel 41 open to the atmosphere and the second open-to-atmosphere channel 42 closed rather than being open to the atmosphere.

Control Processing

Here, control processing of the liquid ejection apparatus 11 will be described. Here, the order of control processing operations can be arbitrarily replaced in the range without departing from the purpose of each of the control processing operations.

Mode Control Processing

First, mode control processing will be described with reference to FIG. 3. The mode control processing is processing performed by the control portion 70 at predetermined cycles.

In step S11, the control portion 70 determines whether an instruction to select the transport mode has been issued based on an operation signal from the operation portion 72 as illustrated in FIG. 3. The instruction to select the transport mode may be issued in response to an operation of the operation portion 72 by a user, a serviceperson, or the like. When it is determined that no instruction to select the transport mode has been issued, the control portion 70 does not perform steps S12 to S14 and proceeds to the processing of step S15. In this case, the control portion 70 maintains the normal mode without performing control to switch to the transport mode. On the other hand, it is determined that an instruction to select the transport mode has been issued, the control portion 70 proceeds to the processing of step S12. The control portion 70 that performs such processing functions as the selection portion 70A.

In step S12, the control portion 70 stores information indicating the transport mode in the nonvolatile memory, and sets the transport mode. Then, in step S13, the control portion 70 performs a closing operation of closing the seventh selector valve 49G and the eleventh selector valve 49K and closing the second open-to-atmosphere channel 42. In this way, when the transport mode is selected, the control portion 70 causes the seventh selector valve 49G and the eleventh selector valve 49K to close the second open-to-atmosphere channel 42.

In the embodiment, the sixth selector valve 49F and the tenth selector valve 49J are open, and the first open-to-atmosphere channel 41 is open to the atmosphere. As described above, the control portion 70 performs control to switch from the normal mode in which the first open-to-atmosphere channel 41 is open to the atmosphere and the second open-to-atmosphere channel 42 is open to the atmosphere to the transport mode in which the first open-to-atmosphere channel 41 is open to the atmosphere and the second open-to-atmosphere channel 42 is closed rather than being open to the atmosphere.

Next, in step S14, the control portion 70 causes the display portion 71 to display handling information. The handling information may include information prompting the user to remove the liquid container 90 from the mounting portion 23. The handling information may include information prompting the user to switch off the power. In this way, when the transport mode is selected, the control portion 70 causes the display portion 71 to display information prompting the user to remove the liquid container 90 from the mounting portion 23 and information prompting the user to switch off the power.

In step S15, the control portion 70 determines whether an instruction to switch off the power has been issued based on an operation signal from a power button, which is not illustrated. If it is determined that the instruction to switch off the power has been issued, the control portion 70 switches off the power in step S16. On the other hand, if it is determined that no instruction to switch off the power has been issued, the control portion 70 ends the mode control processing.

Start-Up Processing

Next, start-up processing will be described with reference to FIG. 4. The start-up processing is performed when the power is switched on from an OFF state.

Figure 4:
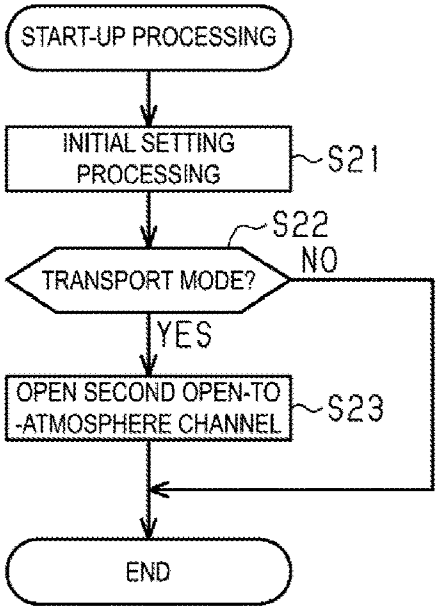
FIG. 4 is a flowchart illustrating start-up processing.

In step S21, the control portion 70 performs initial setting processing for performing initial settings of the liquid ejection apparatus 11 as illustrated in FIG. 4. Then, in step S22, the control portion 70 reads information about the mode from the nonvolatile memory and determines whether the transport mode has been set. When it is determined that the transport mode has not been set, the control portion 70 ends the start-up processing without performing step S23. On the other hand, when it is determined that the transport mode has been set, the control portion 70 proceeds to the processing of step S23.

In step S23, the control portion 70 performs an opening operation of opening the seventh selector valve 49G and the eleventh selector valve 49K to open the second open-to-atmosphere channel 42 to the atmosphere. In this way, when the transport mode is selected and then the power is switched on from the OFF state, the control portion 70 performs the opening operation of opening the seventh selector valve 49G and the eleventh selector valve 49K to open the second open-to-atmosphere channel 42. In the embodiment, the first open-to-atmosphere channel 41 is kept open to the atmosphere. When this processing ends, the control portion 70 ends the start-up processing.

Actions of First Embodiment

Actions of the first embodiment will be described.

In the liquid ejection apparatus 11, when a liquid is stored in the tank unit 22, the first storage portion 24 needs to be open to the atmosphere. This is to suppress the inside of the liquid container 90 being pressurized even when the air inside the liquid container 90 expands due to a change in temperature and a change in pressure. In addition, when the liquid container 90 is mounted on the mounting portion 23, the liquid is supplied from the liquid container 90 to the first storage portion 24. In this way, the liquid is stored in the first storage portion 24.

In this manner, when the first liquid level 56 undulates due to vibration or the like caused during transport with the liquid stored in the first storage portion 24, the first liquid level 56 may be positioned below the lower end 53A of the lead-in portion 53. In such a situation, the liquid in the liquid container 90 is supplied to the first storage portion 24 due to the water head difference. As a result, the first liquid level 56 rises.

In particular, when the inside of the first storage portion 24 is open to the atmosphere, the atmospheric pressure is applied to the inside of the first storage portion 24, regardless of the height of the first liquid level 56. For this reason, every time the first liquid level 56 in the first storage portion 24 undulates due to vibration or the like generated during transport and the first liquid level 56 is positioned below the lower end 53A of the lead-in portion 53, the liquid in the liquid container 90 is continuously supplied to the first storage portion 24.

On the other hand, even if the first liquid level 56 undulates due to vibration or the like during transport, when the first liquid level 56 is not positioned below the lower end 53A of the lead-in portion 53, the liquid in the liquid container 90 is not supplied to the first storage portion 24.

When the first liquid level 56 undulates due to vibration or the like during transport, the on-off valve 27 is opened due to a water head difference, and the liquid in the first storage portion 24 is supplied to the second storage portion 25 through the lead-out channel 26.

In particular, in the normal mode, both the inside of the first storage portion 24 and the inside of the second storage portion 25 are open to the atmosphere. As a result, even if there is a difference between the first liquid level 56 and the second liquid level 65, the inside of the first storage portion 24 and the inside of the second storage portion 25 have the same atmospheric pressure. For this reason, every time the first liquid level 56 undulates due to vibration or the like during transport, the liquid in the first storage portion 24 is continuously supplied to the second storage portion 25. Then, since the on-off valve 27 is provided on the lead-out channel 26, the liquid in the second storage portion 25 is not supplied to the first storage portion 24, and thus the second liquid level 65 becomes higher than the first liquid level 56, and has a risk of reaching the second gas-liquid separation membrane 64.

In addition, while the height of the first liquid level 56 can be detected if the liquid amount sensor 55 is provided in the first storage portion 24 and the power on, the height of the second liquid level 65 cannot be detected since no liquid amount sensor is provided in the second storage portion 25. In addition, even if the height of the first liquid level 56 can be detected, the second liquid level 65 is not the same height as the first liquid level 56. Therefore, when the liquid is supplied to the liquid ejection head 13 at the high second liquid level 65, there is a risk of an excessive water head being applied to the liquid ejection head 13.

Therefore, the transport mode that can be set on the assumption that the liquid level in the tank unit 22 undulates during transport or the like is provided. In the transport mode, the inside of the second storage portion 25 is not open to the atmosphere, but is closed. Then, the first liquid level 56 undulates due to vibration or the like during transport, and the liquid in the first storage portion 24, albeit in a slight amount, is supplied to the second storage portion 25.

However, since the air inside the second storage portion 25 is not supplied into the first storage portion 24, the pressure inside the second storage portion 25 becomes higher. Accordingly, if the second liquid level 65 reaches a certain height, the pressure inside the second storage portion 25 becomes higher than the pressure inside the first storage portion 24, the on-off valve 27 is not opened, and the liquid in the first storage portion 24 is not supplied to the second storage portion 25. Thus, if the transport mode is selected on the assumption that the liquid level inside the tank unit 22 undulates during transport or the like, the rise of the second liquid level 65 can be avoided.

Effects of First Embodiment

Effects of the first embodiment will be described.

(1-1) The second open-to-atmosphere channel 42 can be closed by selecting the transport mode. Thus, even when the liquid is supplied from the first storage portion 24 to the second storage portion 25 due to vibration during transport or the like, the supply of the liquid from the first storage portion 24 to the second storage portion 25 can be stopped by making the pressure inside the second storage portion 25 higher than the pressure inside the first storage portion 24. Therefore, the liquid being supplied from the first storage portion 24 to the second storage portion 25 due to vibration during transport, or the like can be suppressed.

(1-2) In addition to this, the first open-to-atmosphere channel 41 can be opened both when the normal mode is selected and when the transport mode is selected. Accordingly, it is possible to suppress the inside of the liquid container 90 being pressurized even when the air inside the liquid container 90 expands due to a change in temperature and a change in pressure.

(1-3) When the transport mode is selected, it is possible to close the second open-to-atmosphere channel 42 and to give the operator a chance to switch off the power at the timing intended by him or her while making the operator aware of switching off the power. As a result, convenience of the operator can be enhanced.

(1-4) When the transport mode is selected, the second open-to-atmosphere channel 42 can be closed and the operator can be given a chance to switch off the power at the timing intended by him or her while making the operator aware of removing the liquid container 90. As a result, convenience of the operator can be enhanced.

(1-5) Even if the second open-to-atmosphere channel 42 is closed when the transport mode is selected and then the power is switched on from the OFF state, the second open-to-atmosphere channel 42 can be opened by performing an opening operation. As a result, convenience of the operator can be enhanced.

Second Embodiment

Next, a second embodiment will be described. In the following explanation, configurations identical to those in the above-described embodiment will be denoted by the same reference signs and overlapping description will be omitted or simplified.

Mode Control Processing

Figure 5:
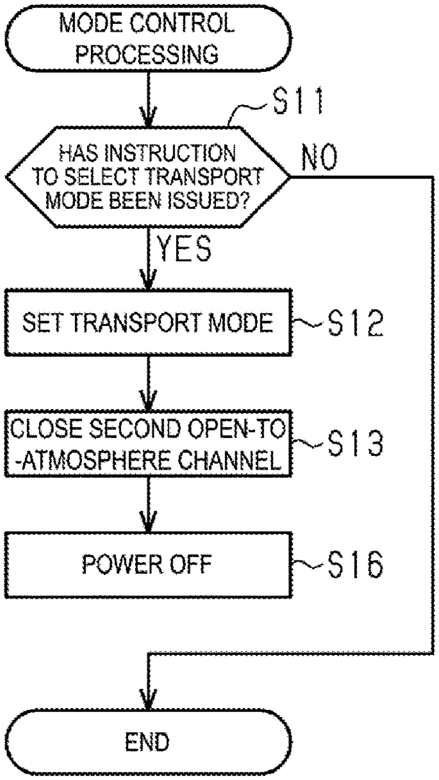
FIG. 5 is a flowchart illustrating the mode control processing.

In the second embodiment, when step S13 ends, the control portion 70 may switch off the power regardless of whether an instruction to switch off the power has been issued in step S16 as illustrated in FIG. 5. In this way, when the transport mode is selected, the control portion 70 may close the second open-to-atmosphere channel 42 and switch off the power.

Effects of Second Embodiment

Effects of the second embodiment will be described.

(2-1) When the transport mode is selected, the second open-to-atmosphere channel 42 can be closed and the power can be switched off. As a result, convenience of the operator can be enhanced.

Third Embodiment

Next, a third embodiment will be described.

Drive Mechanism 40

Figure 6:
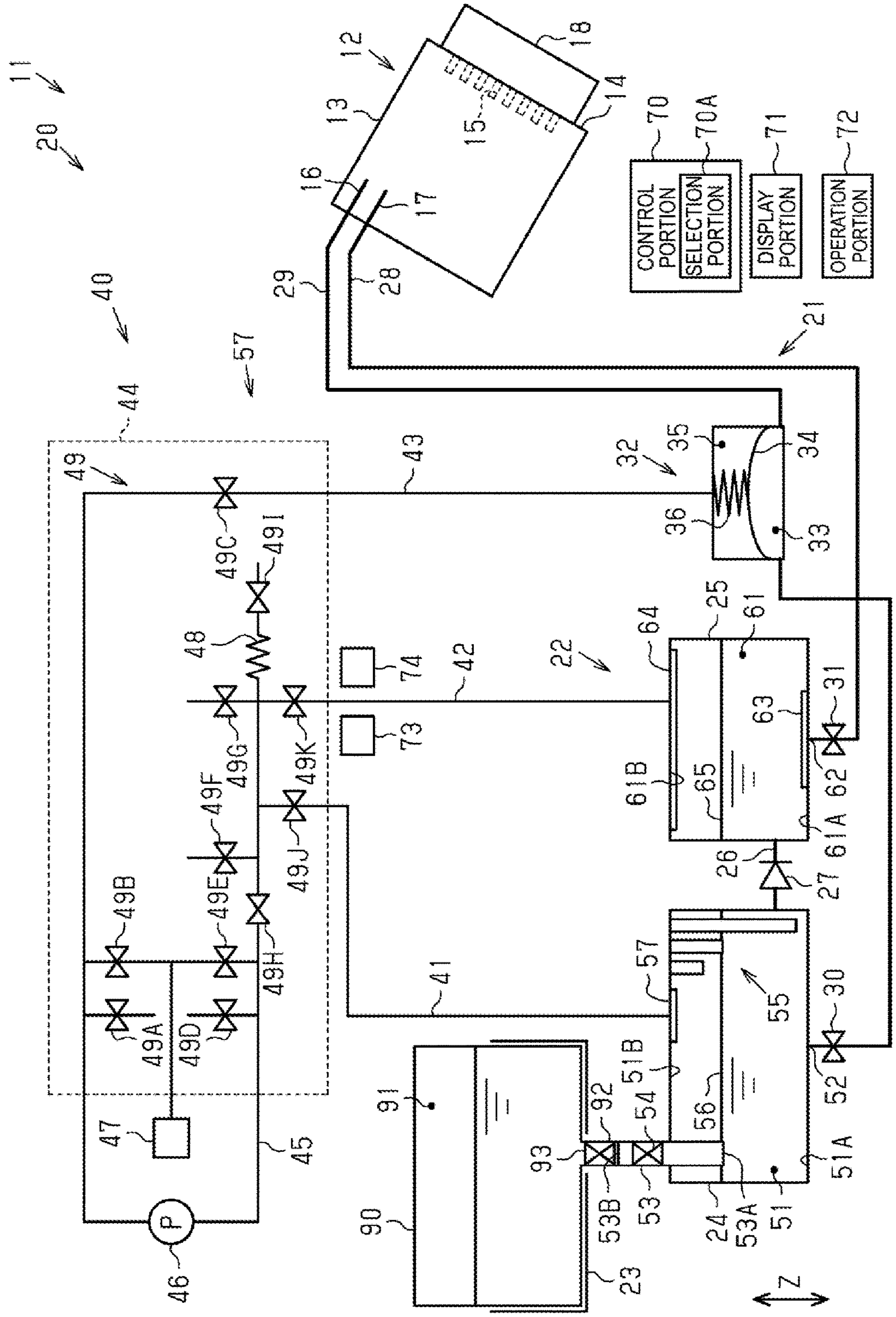
FIG. 6 is a schematic diagram of a liquid ejection apparatus.

The drive mechanism 40 includes a switching operation portion 73 as illustrated in FIG. 6. The switching operation portion 73 is configured to be operable by an operator such as a user or a serviceperson. The switching operation portion 73 can be used to switch between the open and closed states of the seventh selector valve 49G and the eleventh selector valve 49K manually. That is, the switching operation portion 73 can be used to switch between the open and closed states of the second valve manually. Furthermore, the seventh selector valve 49G and the eleventh selector valve 49K may not be configured as selector valves.

The drive mechanism 40 includes a detection portion 74. The detection portion 74 is configured to detect the open and closed states of the seventh selector valve 49G and the eleventh selector valve 49K. That is, the detection portion 74 can detect the open and closed states of the second open-to-atmosphere channel 42 by detecting the open and closed states of the second valve. The control portion 70 receives the detection signal indicating the detection result of the detection portion 74 from the detection portion 74.

Start-Up Processing

Figure 7:
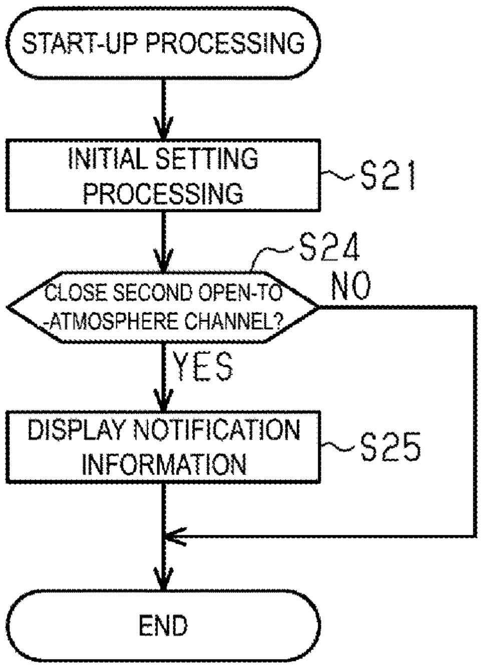
FIG. 7 is a flowchart illustrating start-up processing.
Figure 8:
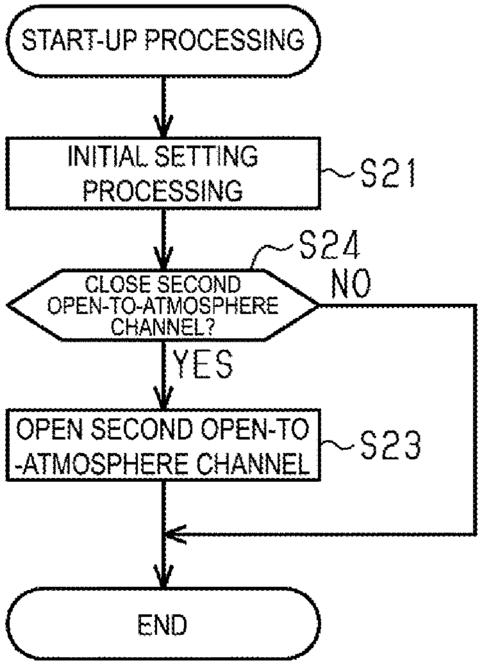
FIG. 8 is a flowchart illustrating start-up processing.

When step S21 ends in the start-up processing, the control portion 70 determines whether the seventh selector valve 49G and the eleventh selector valve 49K serving as the second valve are closed based on the detection signal from the detection portion 74 in step S24 as illustrated in FIG. 7.

When the control portion 70 determines that the seventh selector valve 49G and the eleventh selector valve 49K are not closed, the control portion 70 ends the start-up processing without executing step S25. On the other hand, when the control portion 70 determines that at least one of the seventh selector valve 49G or the eleventh selector valve 49K is closed, the control portion 70 proceeds to the processing of step S25.

The control portion 70 causes the display portion 71 to display notification information in step S25. The notification information may include information of a notification that at least one of the seventh selector valve 49G or the eleventh selector valve 49K is closed. The notification information may include information of a notification that the seventh selector valve 49G and the eleventh selector valve 49K are to be opened.

In this way, in a case in which the detection portion 74 has detected that the second open-to-atmosphere channel 42 is closed when the power is switched on from an OFF state, the control portion 70 causes the display portion 71 to display information indicating that the second open-to-atmosphere channel 42 is closed. When this processing ends, the control portion 70 ends the start-up processing.

Effects of Third Embodiment

Effects of the third embodiment will be described.

(3-1) Even when the transport mode is not selected before the power is switched off, the second open-to-atmosphere channel 42 can be closed by manually switching the switching operation portion 73 after the power is switched off without switching the power on from the OFF state again. As a result, convenience of the operator can be enhanced.

(3-2) Even if the second open-to-atmosphere channel 42 is closed when the power is switched on from the OFF state, the operator can be made aware of the fact that the second open-to-atmosphere channel 42 is closed. As a result, convenience of the operator can be enhanced.

Fourth Embodiment

Next, a fourth embodiment will be described.

Start-Up Processing

In the start-up processing, when the control portion 70 determines that at least one of the seventh selector valve 49G or the eleventh selector valve 49K is closed in step S24, the control portion 70 may proceed to the processing of step S23. In step S23, the control portion 70 performs an opening operation of opening the seventh selector valve 49G and the eleventh selector valve 49K to open the second open-to-atmosphere channel 42 to the atmosphere.

In this way, in the case in which the detection portion 74 has detected that the second open-to-atmosphere channel 42 is closed when the power is switched on from the OFF state, the control portion 70 causes the seventh selector valve 49G and the eleventh selector valve 49K to perform an opening operation of opening the second open-to-atmosphere channel 42. When this processing ends, the control portion 70 ends the start-up processing.

Effects of Fourth Embodiment

Effects of the fourth embodiment will be described.

(4-1) Even if the second open-to-atmosphere channel 42 is closed when the power is switched on from the OFF state after the transport mode is selected, the second open-to-atmosphere channel 42 can be opened by performing an opening operation. As a result, convenience of the operator can be enhanced.

Fifth Embodiment

Next, a fifth embodiment will be described.

Start-Up Processing

Figure 9:
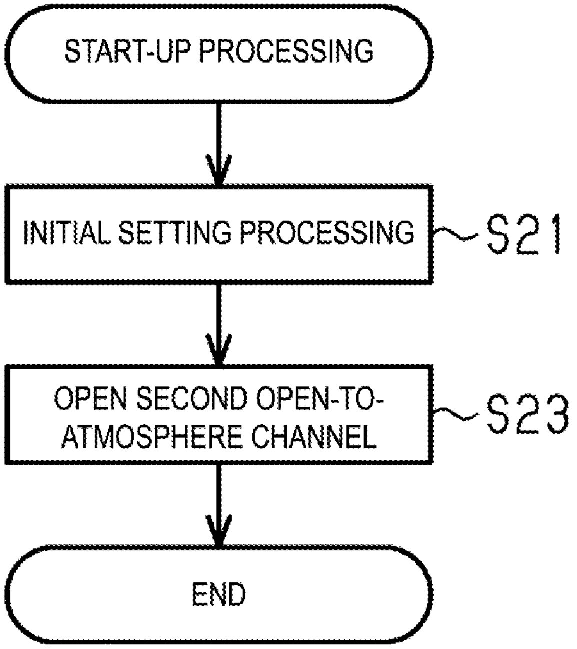
FIG. 9 is a flowchart illustrating start-up processing.

As illustrated in FIG. 9, in the start-up processing, when step S21 ends, in step S23, the control portion 70 may perform an opening operation of opening the seventh selector valve 49G and the eleventh selector valve 49K to open the second open-to-atmosphere channel 42 to the atmosphere. That is, the control portion 70 may cause the seventh selector valve 49G and the eleventh selector valve 49K to perform the opening operation of opening the second open-to-atmosphere channel 42 every time the power is switched on from the OFF state. When this processing ends, the control portion 70 ends the start-up processing.

Effects of Fifth Embodiment

Effects of the fifth embodiment will be described.

(5-1) When the power is switched on from the OFF state, the second open-to-atmosphere channel 42 can be opened regardless of whether the second open-to-atmosphere channel 42 is closed. As a result, convenience of the operator can be enhanced.

Sixth Embodiment

Next, a sixth embodiment will be described.

Micro-Pressurization Unit 32

Figure 10:
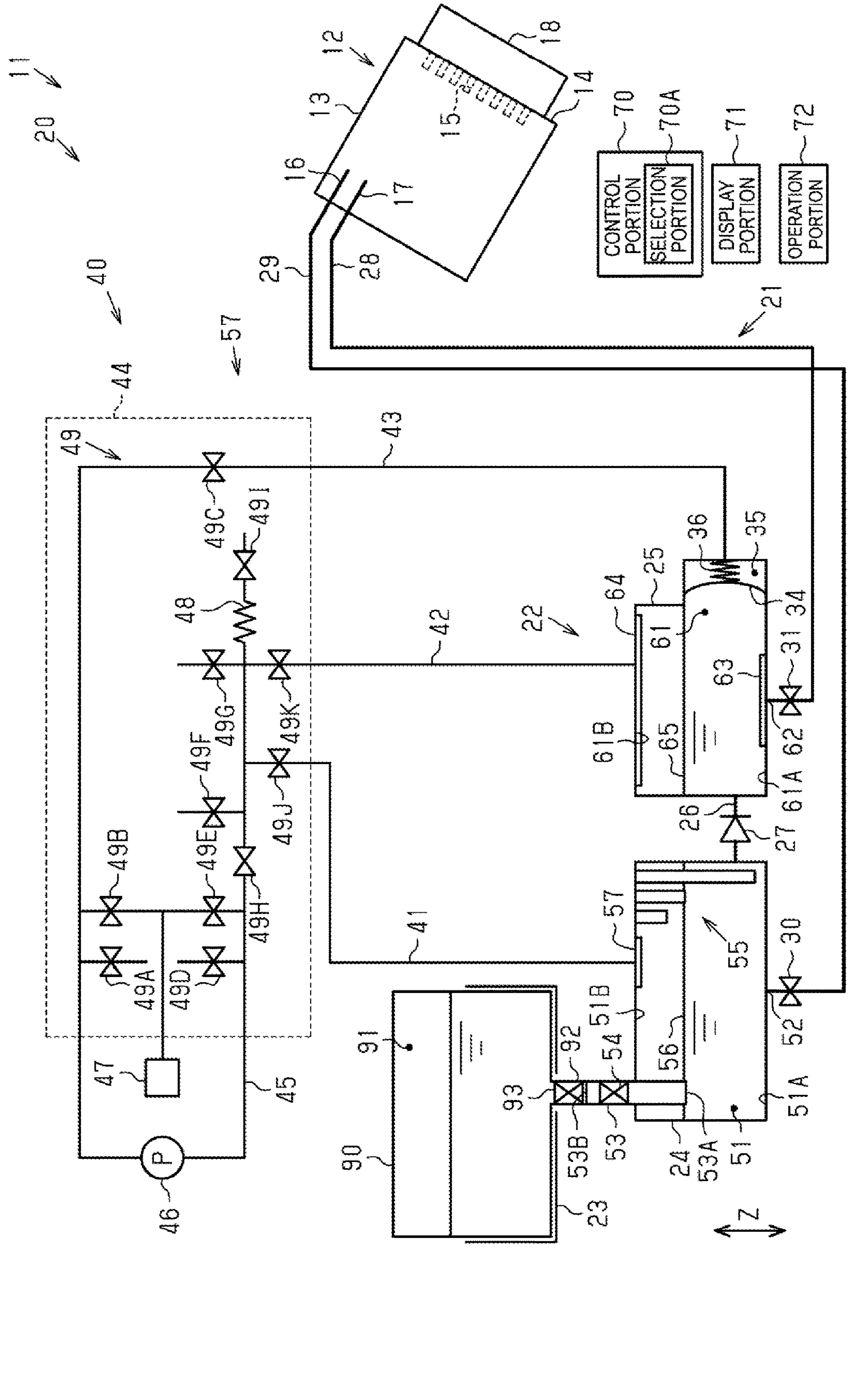
FIG. 10 is a schematic diagram of a liquid ejection apparatus.

In the sixth embodiment, the micro-pressurization unit 32 may be provided integrally with the second storage portion 25 as illustrated in FIG. 10. That is, the liquid chamber 33 of the first embodiment may be configured to communicate with the second storage chamber 61. In other words, the liquid chamber 33 of the first embodiment may be provided integrally with the second storage chamber 61.

In this case, when micro-pressurized discharge is to be performed, the control portion 70 closes the first channel valve 30 and the second channel valve 31, opens the second storage portion 25 to the atmosphere, and then reduces the pressure inside the air chamber 35. Then, the control portion 70 closes the second storage portion 25 from the atmosphere, opens the second channel valve 31, and then opens the air chamber 35 to the atmosphere. Accordingly, the liquid can be discharged from each of the plurality of nozzles 15 through the micro-pressurization unit 32 and the supply channel 28 during the micro-pressurized discharge.

In this way, the second channel valve 31 can be interposed between the micro-pressurization unit 32 and the liquid ejection head 13 on the supply channel 28 by providing the micro-pressurization unit 32 upstream of the second channel valve 31. As a result, when the pressure inside the air chamber 35 is reduced during micro-pressurized discharge, air bubbles and foreign matters being attracted from each of the plurality of nozzles 15 can be suppressed.

In addition, the micro-pressurization unit 32 is provided between the second storage portion 25 and the liquid ejection portion 12, rather than between the first storage portion 24 and the liquid ejection portion 12. As a result, when the pressure inside the air chamber 35 is reduced during micro-pressurized discharge, the on-off valve 27 sticking to the surrounding walls can be suppressed, and the liquid can be smoothly supplied from the first storage portion 24 to the second storage portion 25.

In addition to the above effect, when the pressure inside the air chamber 35 is reduced during micro-pressurized discharge, the liquid can draw from the first storage portion 24 to the second storage portion 25, and the first gas-liquid separation membrane 57 being wet due to the liquid stored in the first storage chamber 51 can be suppressed. As a result, the first storage chamber 51 can be smoothly filled with a liquid, for example, at the time of filling with the liquid and at the time of flushing. In addition, the liquid can be smoothly supplied from the first storage portion 24 to the second storage portion 25.

In addition, although the switching mechanism 44 includes the thin tube portion 48 in the first embodiment so that the flexible member 34 is smoothly flexed, the switching mechanism 44 may not include the thin tube portion 48 in the sixth embodiment. As a result, the driving speed of the micro-pressurization unit 32 can be enhanced.

Seventh Embodiment

Next, a seventh embodiment will be described.

Micro-Pressurization Unit 32

Figure 11:
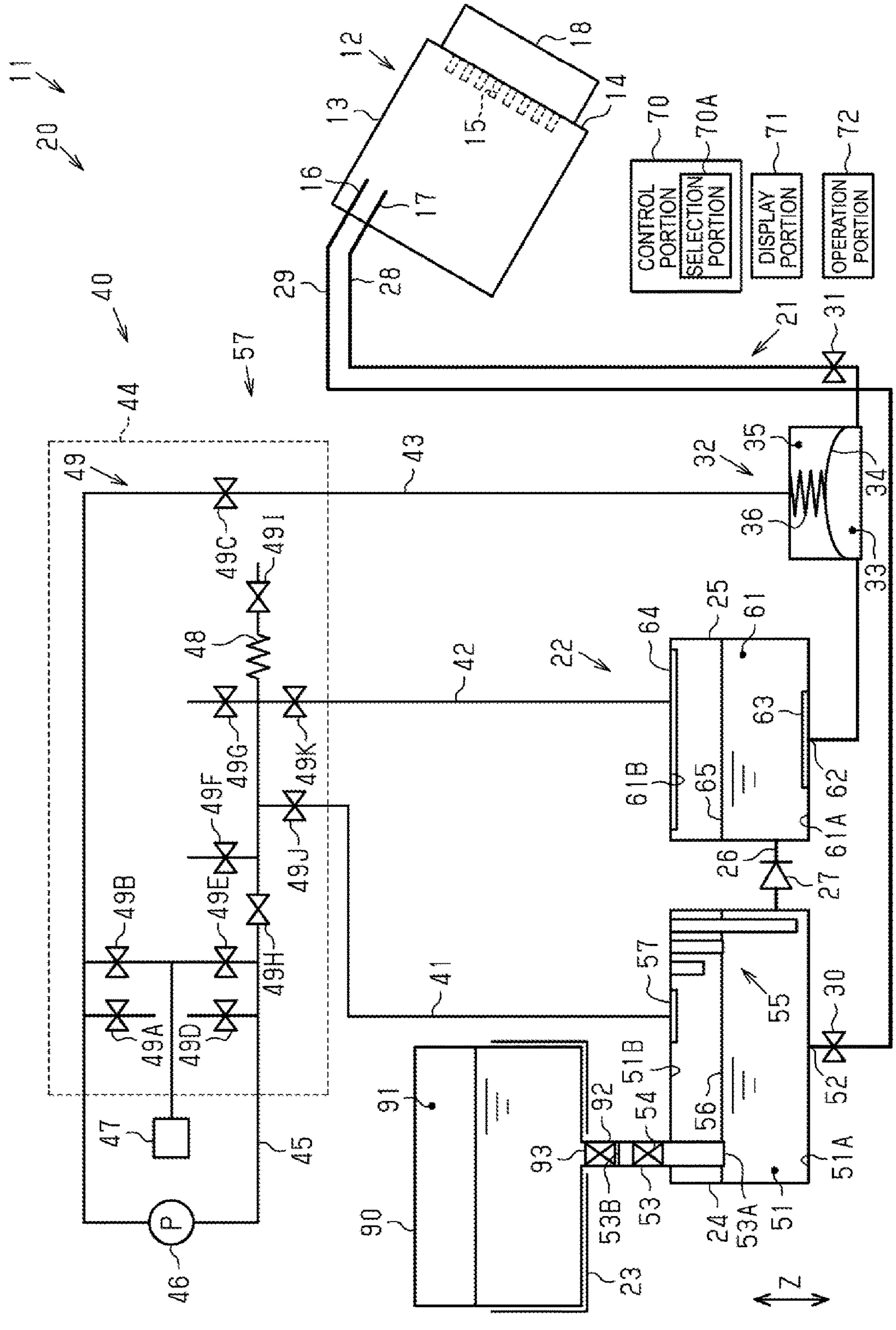
FIG. 11 is a schematic diagram of a liquid ejection apparatus.

In the seventh embodiment, the micro-pressurization unit 32 may be provided between the supply port 62 and the second channel valve 31 as illustrated in FIG. 11. That is, the micro-pressurization unit 32 may be provided between the second storage portion 25 and the second channel valve 31 in the supply channel 28. In addition, the micro-pressurization unit 32 may be provided separately from the second storage portion 25. Also in the seventh embodiment, the switching mechanism 44 may not include the thin tube portion 48 as in the sixth embodiment. Also in the seventh embodiment, the same effects as in the sixth embodiment can be exhibited.

Eighth Embodiment

Next, an eighth embodiment will be described.

Detailed Configuration of Lead-In Portion 53

Here, a detailed configuration of the lead-in portion 53 will be described with reference to FIGS. 12 to 14.

Figure 12:
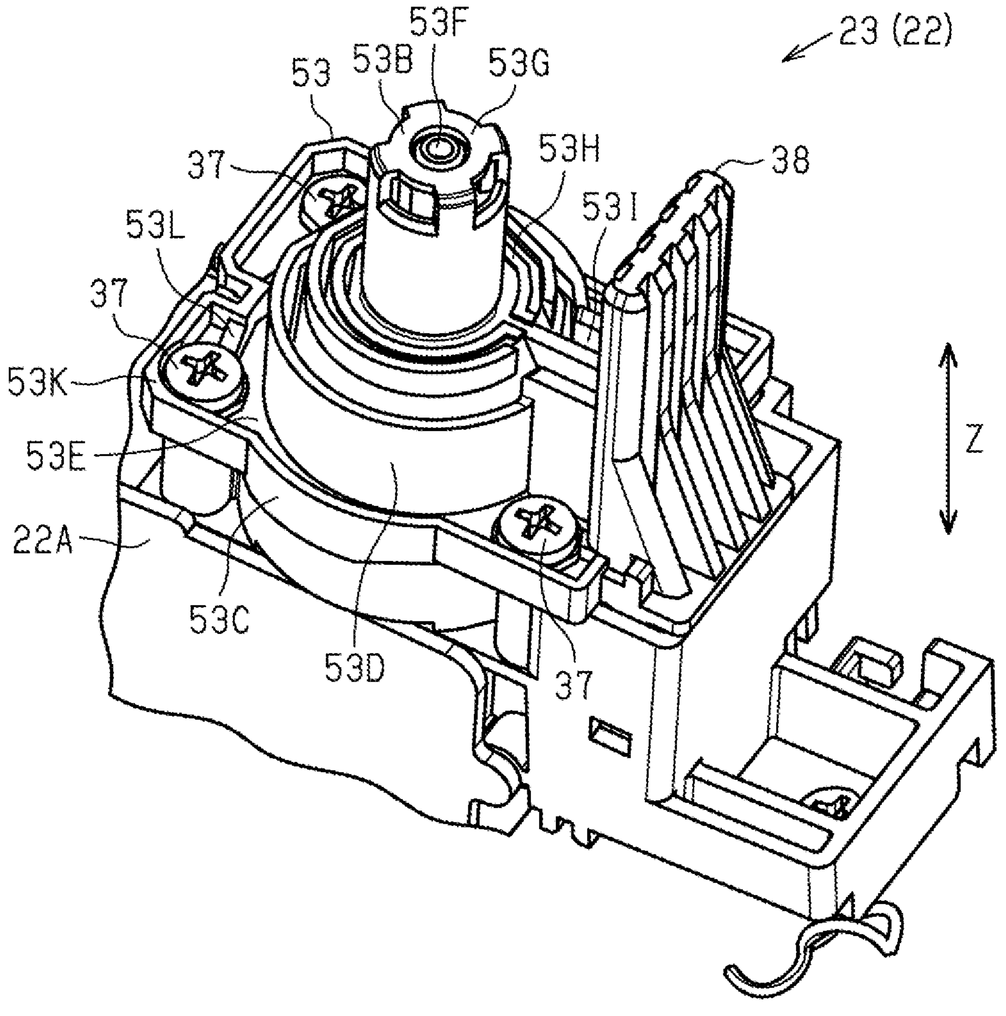
FIG. 12 is a perspective view illustrating a lead-in portion.
Figure 13:
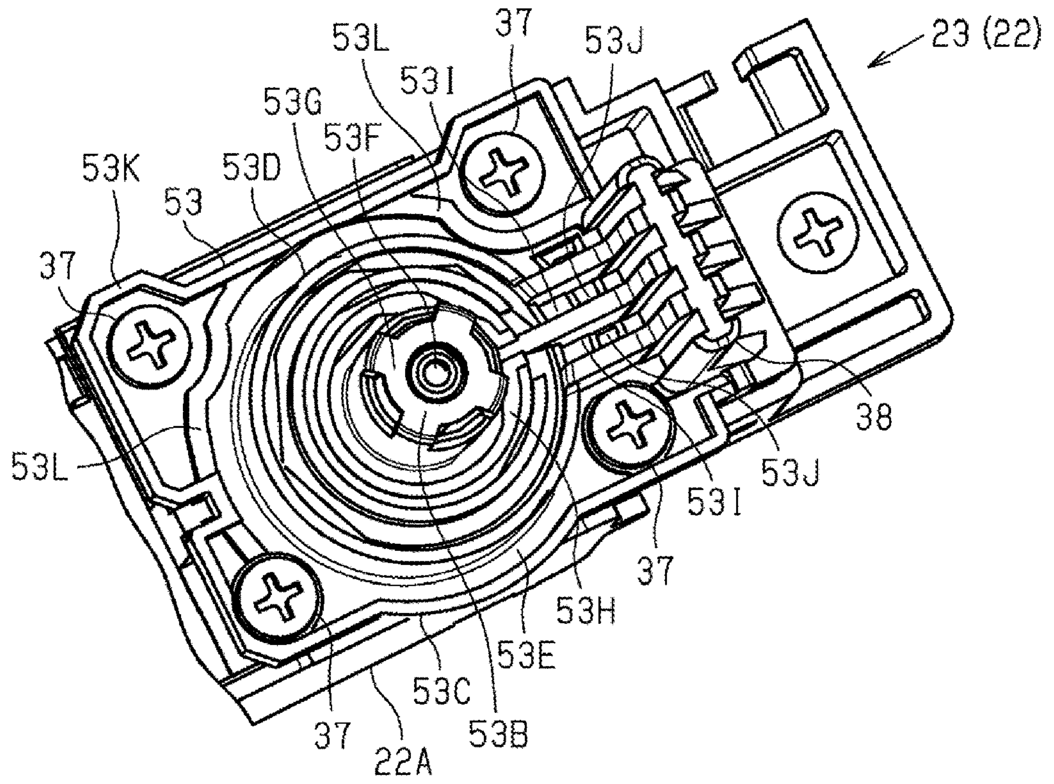
FIG. 13 is a perspective view illustrating the lead-in portion.

The tank unit 22 includes a unit main body 22A as illustrated in FIGS. 12 and 13. In the mounting portion 23 of the tank unit 22, the lead-in portion 53 is provided to protrude from the unit main body 22A upward in the vertical direction Z. The lead-in portion 53 may be fixed to the unit main body 22A by threading a plurality of screws 37.

The tank unit 22 includes a positioning portion 38. The positioning portion 38 is provided in the mounting portion 23. The positioning portion 38 is provided at the position corresponding to the lead-in portion 53. The positioning portion 38 is provided to protrude upward and is engageable with a positioning hole, which is not illustrated, of the liquid container 90. The positioning portion 38 may be inclined at the same predetermined angle as the lead-in portion 53. Accordingly, when the liquid container 90 is to be mounted in the mounting portion 23, the positioning portion 38 appropriately guides the lead-out portion 92 toward the lead-in portion 53.

The lead-in portion 53 may be provided to be inclined at a predetermined angle with respect to the vertical direction Z. The lead-in portion 53 may be provided to be inclined with respect to the vertical direction Z toward the direction in which the positioning portion 38 is disposed. The predetermined angle may be, for example, within the range from 1 to 15 degrees. In addition, similarly to the lead-in portion 53, the liquid container 90 is mounted on the mounting portion 23 to be inclined at a predetermined angle with respect to the vertical direction Z. For this reason, the liquid contained in the liquid container 90 can be substantially used up.

The lead-in portion 53 includes a base portion 53C and a convex portion 53D. The base portion 53C includes a base top surface 53E. The base top surface 53E is a surface facing above the base portion 53C. The convex portion 53D has a truncated cone shape and is provided to protrude from the base top surface 53E upward in the vertical direction Z. The upper end of the convex portion 53D constitutes the upper end 53B of the lead-in portion 53.

The lead-in portion 53 includes a lead-in port 53F. The lead-in port 53F is an opening for introducing the liquid supplied from the liquid container 90. The lead-in port 53F is provided at an upper end of the convex portion 53D.

The lead-in portion 53 includes a first wall portion 53G. The first wall portion 53G is provided at an upper end of the convex portion 53D. The first wall portion 53G has an annular shape and is provided to surround the circumference of the lead-in port 53F, leaving the lead-in port 53F hollow. The first wall portion 53G can mitigate splattering of the liquid from the lead-in port 53F.

The lead-in portion 53 includes a guide groove 53H, a guide recess 53I, and a guide hole 53J. The guide groove 53H is provided below the first wall portion 53G in the vertical direction Z. The guide groove 53H has an annular shape and is provided to surround the circumference of the first wall portion 53G, leaving the first wall portion 53G hollow when viewed from above in the vertical direction Z. The guide groove 53H is a groove for guiding the liquid splattering from the lead-in port 53F over the first wall portion 53G to the guide recess 53I.

The guide recess 53I is provided between the guide groove 53H and the positioning portion 38. One end of the guide recess 53I is coupled to an end of the guide groove 53H. The guide recess 53I may be inclined downward in the direction from the guide groove 53H toward the positioning portion 38. The guide recess 53I is a recess for guiding the liquid from the end of the guide groove 53H to the guide hole 53J. With this configuration, even when the liquid splatters from the lead-in port 53F over the first wall portion 53G, the guide groove 53H, the guide recess 53I, and the guide hole 53J guide the liquid to the guide hole 53J, and thus the liquid leaking can be suppressed.

The guide hole 53J is open downward at the other end of the guide recess 53I. That is, the guide hole 53J is provided at the downwardly inclined end of the guide recess 53I. The guide hole 53J is a hole for guiding the liquid guided by the guide recess 53I to an absorption portion, which is not illustrated.

Figure 14:
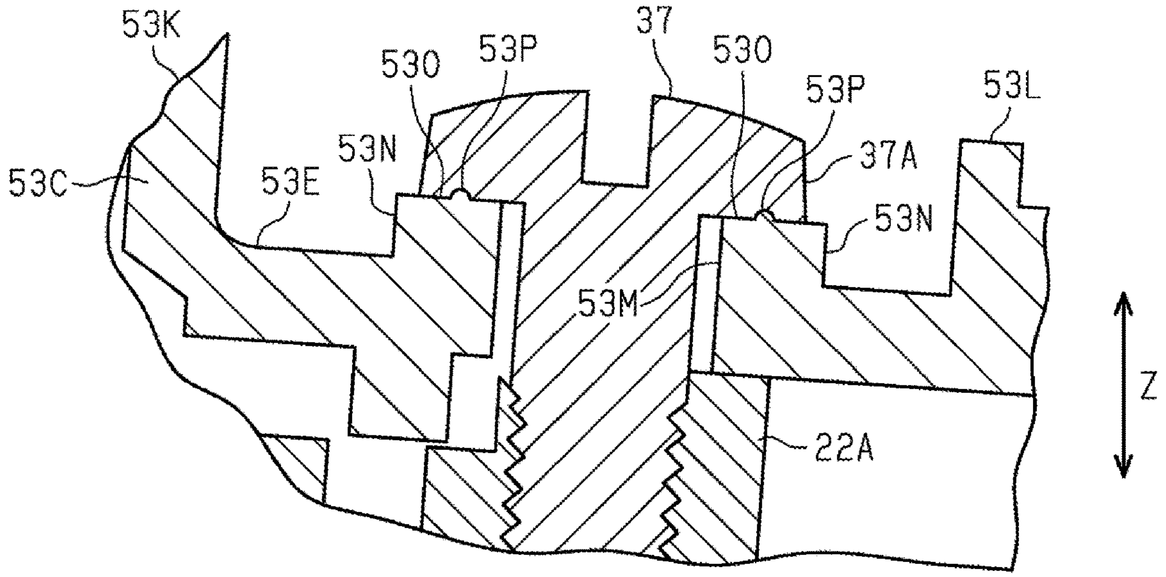
FIG. 14 is a cross-sectional view illustrating a part of the lead-in portion.

The lead-in portion 53 includes a second wall portion 53K as illustrated in FIGS. 12 to 14. The second wall portion 53K is provided to surround the circumference of the base portion 53C. The second wall portion 53K is provided to protrude from the base top surface 53E upward in the vertical direction Z. Even when the liquid splatters from the lead-in port 53F over the first wall portion 53G and further over the guide groove 53H or the guide recess 53I, the second wall portion 53K can suppress the liquid leaking from the base top surface 53E to the outside of the lead-in portion 53.

The lead-in portion 53 includes a third wall portion 53L and a plurality of through holes 53M. Each of the plurality of through holes 53M is provided to penetrate the base portion 53C in the vertical direction Z. Each of the plurality of through holes 53M is a hole through which the screw 37 can penetrate.

The third wall portion 53L is provided to surround some of the plurality of through holes 53M together with the second wall portion 53K. The third wall portion 53L is provided to protrude from the base top surface 53E upward in the vertical direction Z. Even when the liquid splatters from the lead-in port 53F over the first wall portion 53G and further over the guide groove 53H or the guide recess 53I, the third wall portion 53L can suppress the liquid leaking from the base top surface 53E to the through holes 53M.

The lead-in portion 53 includes a protruding piece 53N. The protruding piece 53N is provided to protrude from the base top surface 53E upward in the vertical direction Z. The protruding piece 53N has an annular shape and is provided to surround each of the plurality of through holes 53M. The protruding piece 53N has an outer diameter larger than that of the head portion 37A of the screw 37. Even when the liquid splatters from the lead-in port 53F over the first wall portion 53G and further over the guide groove 53H or the guide recess 53I, the protruding piece 53N can suppress the liquid leaking from the base top surface 53E to the through holes 53M.

The protruding piece 53N includes a top surface 53O. The top surface 53O is a surface facing upward in the vertical direction Z. When the screw 37 is threaded into the unit main body side 22A, the top surface 53O comes into contact with the head portion 37A of the screw 37.

The protruding piece 53N includes a convex portion 53P. The convex portion 53P is provided to protrude upward in the vertical direction Z on the top surface 53O. The convex portion 53P has an annular shape and is provided to surround each of the plurality of through holes 53M. When the screw 37 is threaded into the unit main body 22A, the convex portion 53P is crushed by the head portion 37A of the screw 37. As a result, even when the liquid splatters from the lead-in port 53F over the first wall portion 53G and further over the guide groove 53H or the guide recess 53I, the protruding piece 53N can suppress the liquid leaking from the base top surface 53E to the through holes 53M.

Detailed Configuration of On-Off Valve 27

Next, a detailed configuration of the on-off valve 27 will be described with reference to FIGS. 15 to 17.

Figure 15:
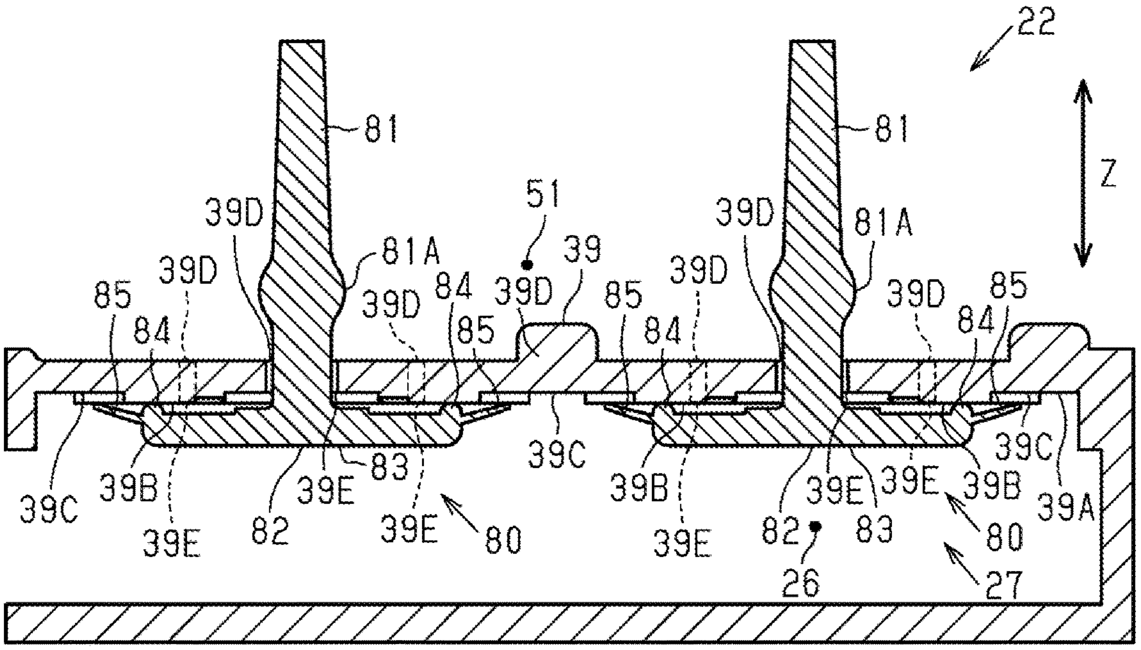
FIG. 15 is a cross-sectional view illustrating an on-off valve.
Figure 16:
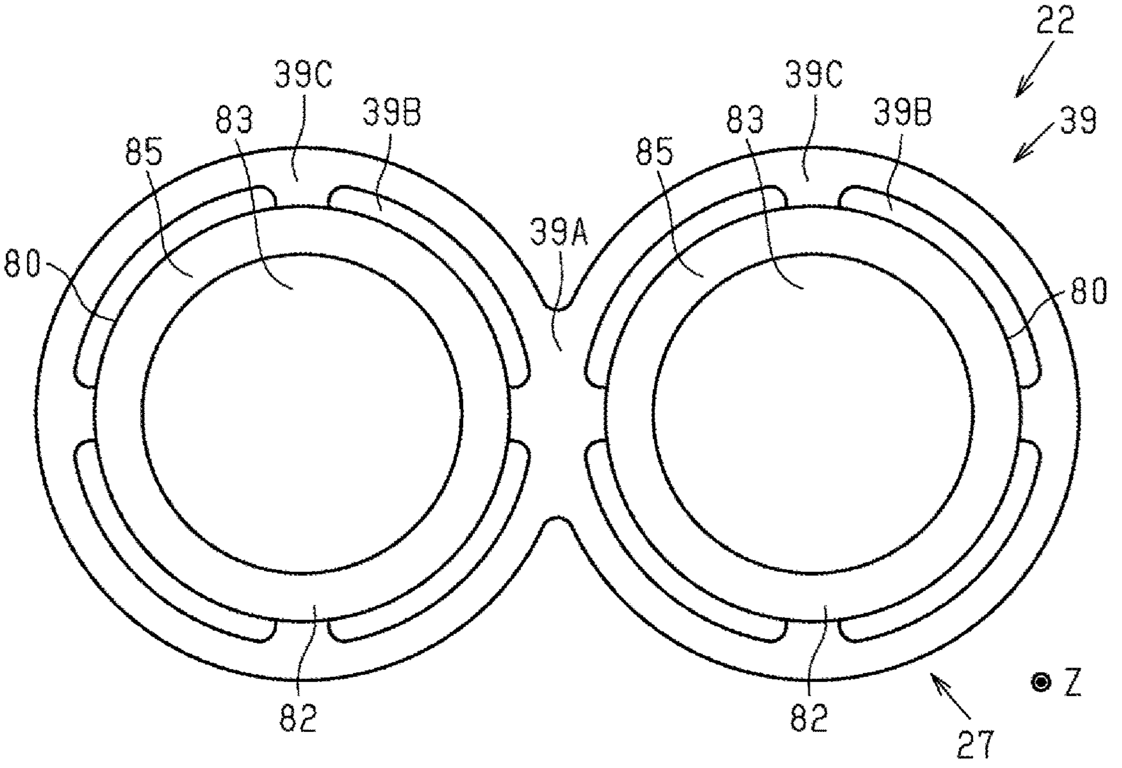
FIG. 16 is a bottom view illustrating the on-off valve.

The tank unit 22 includes a partition wall portion 39 as illustrated in FIGS. 15 and 16. The partition wall portion 39 is provided between the first storage chamber 51 and the lead-out channel 26. When the first storage chamber 51 is included in the upstream channel and the lead-out channel 26 is included in the downstream channel, it can be said that the partition wall portion 39 is provided between the upstream channel and the downstream channel. The partition wall portion 39 is a wall portion that separates the first storage chamber 51 from the lead-out channel 26.

The partition wall portion 39 includes a valve seat 39A. The valve seat 39A is provided in the partition wall portion 39 on the lead-out channel 26 side. The valve seat 39A has a concave shape.

The valve seat 39A includes a sealing surface 39B. The sealing surface 39B is a surface coming into close contact with the check valves 80 to seal the first storage chamber 51 from the lead-out channel 26. Specifically, the sealing surface 39B is configured such that sealing convex portions 84 of the check valves 80 can come into close contact therewith. The sealing surface 39B is provided in the partition wall portion 39 on the lead-out channel 26 side. The sealing surface 39B has a circular shape larger than the outer circumference of the check valves 80. The sealing surface 39B is provided around an opening 39E to be described later. The sealing surface 39B may be subject to texturing.

The valve seat 39A includes recesses 39C. The recesses 39C are more recessed than the sealing surface 39B. The recesses 39C are provided in the partition wall portion 39 on the lead-out channel 26 side. The recesses 39C are provided in order to easily solve the problem of sticking of the check valves 80 to the sealing surface 39B. The recesses 39C are provided around the sealing surface 39B. The recesses 39C are provided closer to the outer circumferential edge of the check valves 80 than to the sealing surface 39B. The recesses 39C are provided at a plurality of positions between parts of the outer circumferential edges of the check valves 80. Specifically, the recesses 39C are provided at positions corresponding to at least a part of the outer circumferential edges of pressure receiving portions 82 of the check valves 80. In this way, a plurality of recesses 39C are provided on the sealing surface 39B.

The partition wall portion 39 includes one or a plurality of communication channels 39D. That is, the communication channels 39D are provided in the partition wall portion 39. The communication channels 39D allow the first storage chamber 51 to communicate with the lead-out channel 26. Each communication channel 39D includes an opening 39E. The opening 39E is open toward the lead-out channel 26 side. That is, the opening 39E is open at the downstream end of the communication channels 39D. The opening 39E can be opened and closed by the check valves 80.

The first storage chamber 51 corresponds to an example of an upstream channel through which a liquid can flow as described above. In addition, the lead-out channel 26, the second storage chamber 61, and the supply channel 28 correspond to an example of a downstream channel whose downstream end is coupled to the liquid ejection portion 12. In addition, the communication channels 39D are configured to allow the upstream channel to communicate with the downstream channel. In particular, a region of the downstream channel upstream of the second channel valve 31 corresponds to an example of a pressurization region communicating with the communication channels 39D. In addition, it can be said that the pressurization portion 46 can pressurize the pressurization region in the downstream channel.

Configuration of Check Valve 80

Figure 17:
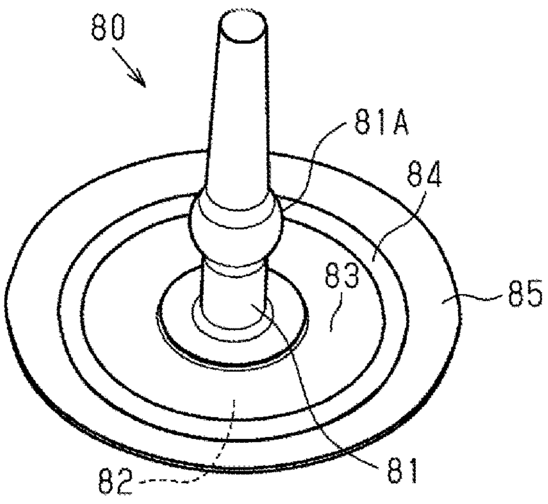
FIG. 17 is a perspective view illustrating a check valve.

The check valves 80 are provided on the lead-out channel 26 side as illustrated in FIGS. 15 to 17. The check valves 80 can open and close the openings 39E. Each check valve 80 includes a shaft portion 81 and the pressure receiving portion 82. The shaft portion 81 extends substantially vertically from the center of the check valve 80. The shaft portion 81 includes a stopper 81A. The stopper 81A is provided at the center of the shaft portion 81 in the axial direction. The stopper 81A has a shape expanding in the radial direction more than the other portion of the shaft portion 81. It can also be said that the shaft portion 81 extends from the center of the check valve 80 toward the communication channel 39D side of the check valve 80, and extends from the center of the sealing convex portion 84, which will be described later, toward the communication channel 39D side of the check valve 80. The shaft portion 81 is inserted into any one of the plurality of communication channels 39D. That is, the shaft portion 81 is inserted into any communication channel 39D.

The pressure receiving portion 28 is disc-shaped. The pressure receiving portion 82 is a surface facing the lead-out channel 26 side and receiving pressure from the lead-out channel 26 side. The pressure receiving portion 82 receives pressure of the pressurization region. The sealing convex portion 84 is provided on the surface on the side opposite to the pressure receiving portion 82, and the inner surface of the sealing convex portion 84 is pressurized from the communication channel 39D side. Furthermore, it can be said that the surface on the side opposite to the pressure receiving portion 82 is a surface facing the extending direction in which the shaft portion 81 extends, and the pressure receiving portion 82 has a surface facing the side opposite to the extending direction.

The pressure receiving portion 82 includes a valve plate portion 83. The valve plate portion 83 is disc-shaped and has a predetermined thickness to increase rigidity. The valve plate portion 83 constitutes a part of the pressure receiving portion 82.

The check valve 80 includes the sealing convex portion 84. The sealing convex portion 84 protrudes in the extending direction from the surface on the side opposite to the pressure receiving portion 82. That is, the sealing convex portion 84 is provided on the communication channel 39D side of the check valve 80. The sealing convex portion 84 has an annular shape and can be brought into close contact with the sealing surface 39B. In this way, the sealing convex portion 84 can be brought into close contact with the periphery of the opening 39E. In addition, the sealing convex portion 84 closes the opening 39E by coming into close contact with the sealing surface 39B.

The pressure receiving portion 82 includes a fin portion 85. The fin portion 85 extends radially outward from the circumferential edge of the valve plate portion 83. The fin portion 85 is annular-shaped. The fin portion 85 is thinner and more flexible than the valve plate portion 83. The thickness of the fin portion 85 may be thinner as it goes to the outer side. The fin portion 85 is provided at a position where a part thereof faces the sealing surface 39B and a part thereof faces the recess 39C. The fin portion 85 constitutes a part of the pressure receiving portion 82.

As described above, the check valve 80 is an umbrella-type valve in which the diameter of the pressure receiving portion 82 is greater than the diameter of the sealing convex portion 84. In addition, the opening 39E is configured to be closed when the force acting on the pressure receiving portion 82 is greater than the force acting on the inner surface of the sealing convex portion 84.

Resolution of Sticking of Check Valve 80

In the related art, a phenomenon that it takes a long time to start supplying the liquid from the first storage portion 24 to the second storage portion 25 may occur. It has been found that the phenomenon is caused by the check valve 80 sticking to the partition wall portion 39 while the check valve 80 closes the opening 39E.

Specifically, the check valve 80 may stick to the partition wall portion 39 due to initial filling of the liquid. A cleaning agent is supplied to the tank unit 22 before shipment. Such a cleaning agent is supplied to the first storage chamber 51, the lead-out channel 26, and the second storage chamber 61, and then discharged from the first storage chamber 51, the lead-out channel 26, and the second storage chamber 61.

In such a case, some amount of cleaning agent may remain between the check valve 80 and the partition wall portion 39 while the check valve 80 is closing the opening 39E. Thus, if the cleaning agent remaining between the check valve 80 and the partition wall portion 39 is dried and solidified over time, the check valve 80 may stick to the partition wall portion 39 while the check valve 80 is closing the opening 39E due to initial filling of the liquid after shipment.

Figure 18:
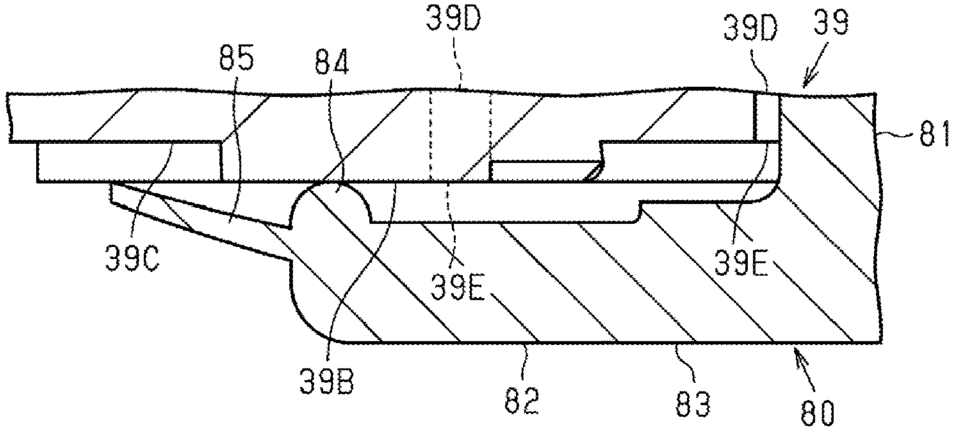
FIG. 18 is a cross-sectional view illustrating the on-off valve.

When the check valve 80 closes the opening 39E, the sealing convex portion 84 is in contact with the sealing surface 39B as illustrated in FIG. 18. If the cleaning agent is solidified at the contact portion where the sealing convex portion 84 is in contact with the sealing surface 39B, the sealing convex portion 84 will be separated from the sealing surface 39B only when a greater force is applied from the communication channel 39D side than when the cleaning agent is not solidified at the contact portion. If the cleaning agent is solidified at the contact portion as described above, the check valve 80 will open the opening 39E only when a greater amount of liquid is stored in the first storage chamber 51 and the communication channel 39D than when the cleaning agent is not solidified at the contact portion. As a result, the phenomenon that it takes a long time to start supplying the liquid from the first storage portion 24 to the second storage portion 25 occurs.

Furthermore, as in the case of the initial filling of the liquid, the check valve 80 may stick to the partition wall portion 39 at the time of refilling of the liquid. Although the liquid is supplied to the tank unit 22 as the liquid ejection apparatus 11 is used after shipment, the liquid stored in the lead-out channel 26 and the second storage chamber 61 may be discharged.

In such a case, a little amount of the liquid may remain between the check valve 80 and the partition wall portion 39 while the check valve 80 is closing the opening 39E. Thus, if the liquid remaining between the check valve 80 and the partition wall portion 39 is dried and solidified over time, the check valve 80 may stick to the partition wall portion 39 while the check valve 80 is closing the opening 39E due to refilling of the liquid.

In order to solve such a problem, the liquid ejection apparatus 11 according to the embodiment is configured to perform a combination of a pressurizing operation of pressurizing the inside of the lead-out channel 26 and the inside of the second storage chamber 61 and a releasing operation of releasing the pressurizing operation. In particular, the liquid ejection apparatus 11 according to the embodiment is configured to perform the combination of the pressurizing operation of pressurizing the inside of the lead-out channel 26 and the inside of the second storage chamber 61 and the releasing operation of releasing the pressurizing operation in accordance with the supply of the liquid to the lead-out channel 26 and the second storage chamber 61.

Figure 19:
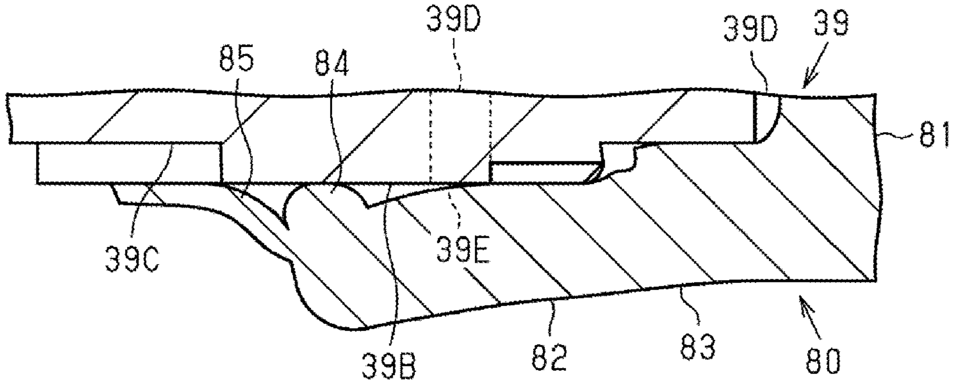
FIG. 19 is a cross-sectional view illustrating the on-off valve.

By performing the pressurizing operation of pressurizing the inside of the lead-out channel 26 and the inside of the second storage chamber 61, the pressure receiving portion 82 is pressurized from the lead-out channel 26 side as illustrated in FIG. 19. As a result, the pressure receiving portion 82 bends toward the communication channel 39D around the shaft portion 81 in the check valve 80. As the sealing convex portion 84 moves along the sealing surface 39B, the cleaning agent or the liquid solidified at the contact portion where the sealing convex portion 84 is in contact with the sealing surface 39B is split, and the sealing convex portion 84 is separated from the sealing surface 39B. As the sealing convex portion 84 moves in accordance with the pressurizing operation as described above, sticking of the check valve 80 to the partition wall portion 39 while the check valve 80 is closing the opening 39E can be solved.

In addition, when the liquid is stored in the first storage chamber 51 and the communication channel 39D, since the releasing operation is performed after the amount of air between the check valve 80 and the partition wall portion 39 is reduced in the pressurizing operation, the bending of the pressure receiving portion 82 is released. Accordingly, the liquid stored in the first storage chamber 51 and the communication channel 39D draw to the lead-out channel 26 side. In this way, the pressurizing operation and the releasing operation can solve the sticking of the check valve 80 to the partition wall portion 39 while closing the opening 39E even if the liquid draws from the first storage chamber 51 and the communication channel 39D to the lead-out channel 26 side.

In particular, since the recesses 39C are provided at the positions corresponding to at least a part of the outer circumferential edges of the pressure receiving portions 82, the area of the outer circumferential edges of the pressure receiving portions 82 and the sealing convex portions 84 coming in contact with the sealing surface 39B can be reduced. This enables easy movement of the sealing convex portions 84.

On the other hand, in order to solve sticking of the check valve 80 to the partition wall portion 39, it is conceivable to pressurize the inside of the first storage chamber 51. However, if the second storage chamber 61 is open to the atmosphere, there is concern that a large amount of liquid would be instantaneously supplied from the first storage chamber 51 to the second storage chamber 61.

In addition, when the inside of the first storage chamber 51 is pressurized over a sufficient length of time, air is supplied to the second storage portion 25 while a small amount of liquid is stored in the first storage portion 24. In such a case, bubbles may be generated in the second storage portion 25. Thus, by performing a combination of the pressurizing operation of pressurizing the inside of the lead-out channel 26 and the inside of the second storage chamber 61 and the releasing operation of releasing the pressurizing operation, bubbles being generated in the second storage portion 25 can be suppressed.

For this reason, a combination of a pressurizing operation of pressurizing the inside of the lead-out channel 26 and the inside of the second storage chamber 61 and a releasing operation of releasing the pressurizing operation may be performed, rather than the pressurizing operation of pressurizing the inside of the first storage chamber 51.

On-Off Valve Operation Processing

Here, on-off valve operation processing will be described with reference to FIG. 20. The on-off valve operation processing is processing executed by the control portion 70 triggered by closing of a cover member, which is not illustrated, after the liquid container 90 is mounted on the mounting portion 23. That is, the on-off valve operation processing is processing executed by the control portion 70 when the lead-out channel 26 and the second storage chamber 61 are filled with a liquid. Specifically, the on-off valve operation processing is processing executed by the control portion 70 when the lead-out channel 26 and the second storage chamber 61 are filled with a liquid for the first time. In addition, the on-off valve operation processing is processing executed by the control portion 70 when the liquid is discharged from the lead-out channel 26 and the second storage chamber 61 and then the lead-out channel 26 and the second storage chamber 61 are filled with a liquid again. Here, the order of processing operations can be arbitrarily replaced in the range without departing from the purpose of each of the processing operations.

Figure 20:
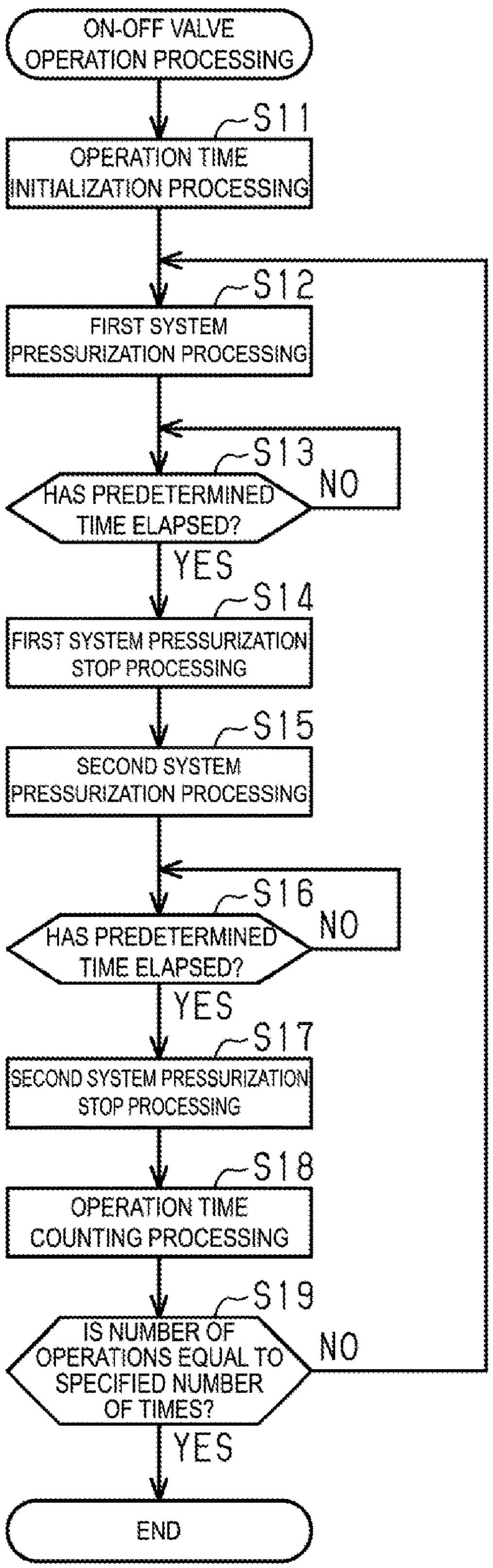
FIG. 20 is a flowchart illustrating on-off valve operation processing.

In step S11, the control portion 70 performs operation time initialization processing as illustrated in FIG. 20. In this processing, the control portion 70 sets an initial value in an operation counter allocated to a memory. Thus, the control portion 70 initializes the operation counter allocated to the memory. When this processing ends, the control portion 70 proceeds to the processing of step S12.

In step S12, the control portion 70 performs first system pressurization processing. In this processing, the control portion 70 controls the switching mechanism 44 and the pressurization portion 46 for the supply mechanism 21 of the first system such that the inside of the second storage portion is pressurized. The supply mechanism 21 of the first system corresponds to, for example, some of the supply mechanisms 21 of the multiple systems, and specifically, may be the supply mechanism 21 corresponding to cyan and the supply mechanism 21 corresponding to magenta. In this way, the control portion 70 causes the pressurization portion 46 to perform the pressurizing operation of pressurizing the pressurization region. In this embodiment, the first channel valve 30 and the second channel valve 31 are closed, and the inside of the first storage portion 24 is open to the atmosphere. When this processing ends, the control portion 70 proceeds to the processing of step S13.

In step S13, the control portion 70 determines whether the specified time has elapsed. If it is determined that the specified time has not elapsed, the control portion 70 proceeds to the processing of step S13 again. If it is determined that the specified time has elapsed, the control portion 70 proceeds to the processing of step S14.

In step S14, the control portion 70 performs first system pressurization stop processing. In this processing, for the supply mechanism 21 of the first system, the control portion controls the switching mechanism 44 and the pressurization portion 46 such that the second open-to-atmosphere channel 42 is open to the atmosphere to stop pressurization of the inside of the second storage portion 25. In this way, the control portion performs the releasing operation of releasing the pressurizing operation. When this processing ends, the control portion 70 proceeds to the processing of step S15.

In step S15, the control portion 70 performs second system pressurization processing. In this processing, for the supply mechanism 21 of the second system, the control portion 70 controls the switching mechanism 44 and the pressurization portion 46 such that the inside of the second storage portion 25 is pressurized. The supply mechanism 21 of the second system corresponds to, for example, some of the supply mechanisms 21 of the multiple systems, and specifically, may be the supply mechanism 21 corresponding to yellow and the supply mechanism 21 corresponding to black. In this way, the control portion 70 causes the pressurization portion 46 to perform the pressurizing operation of pressurizing the pressurization region. When this processing ends, the control portion 70 proceeds to the processing of step S16.

In step S16, the control portion 70 determines whether the specified time has elapsed. If it is determined that the specified time has not elapsed, the control portion 70 proceeds to the processing of step S16 again. If it is determined that the specified time has elapsed, the control portion 70 proceeds to the processing of step S17.

In step S17, the control portion 70 performs second system pressurization stop processing. In this processing, for the supply mechanism 21 of the second system, the control portion 70 controls the switching mechanism 44 and the pressurization portion 46 such that the second open-to-atmosphere channel 42 is open to the atmosphere to stop pressurization of the inside of the second storage portion 25. In this way, the control portion 70 performs the releasing operation of releasing the pressurizing operation. When this processing ends, the control portion 70 proceeds to the processing of step S18.

In the embodiment, it can be said that the control portion 70 performs the releasing operation for the supply mechanism 21 of the second system when performing the pressurizing operation for the supply mechanism 21 of the first system. In addition, it can be said that the control portion 70 performs the releasing operation for the supply mechanism 21 of the first system when performing the pressurizing operation for the supply mechanism 21 of the second system.

In step S18, the control portion 70 performs operation time counting processing. In this processing, the control portion 70 counts the number of operations by updating the operation counter allocated to the memory. When this processing ends, the control portion 70 proceeds to the processing of step S19.

In step S19, the control portion 70 performs whether the number of operations is a specified number of times. Although the specified number of times is three in this embodiment, it may be one or multiple times. If it is determined that the number of operation times is not the specified number of times, the control portion 70 proceeds to the processing of step S12 again. If it is determined that the number of operation times is the specified number of times, the control portion 70 ends the on-off valve operation processing.

In this way, the control portion 70 performs the on-off valve operation processing to pressurize the inside of the second storage portion 25 for the specified time for the supply mechanism 21 of the first system, and then pressurize the inside of the second storage portion 25 for the specified time for the supply mechanism 21 of the second system. This makes it possible to stably pressurize the inside of the second storage portion 25. In addition, the control portion 70 performs each pressurizing processing operation the specified number of times as described above.

That is, the control portion 70 performs the combination of the pressurizing operation and the releasing operation multiple times in accordance with the supply of the liquid to the downstream channel. In addition, when the liquid in the downstream channel is discharged and then supplied again to the downstream channel, the control portion 70 performs the combination of the pressurizing operation and the releasing operation multiple times in accordance with the supply of the liquid to the downstream channel. In other words, the control portion 70 may perform the combination of the pressurizing operation and the releasing operation one or more times.

Actions and Effects of Eighth Embodiment

Next, the actions and effects of the eighth embodiment will be described.

(1) The control portion 70 performs a combination of a pressurizing operation of pressurizing the second storage portion 25 and the lead-out channel 26 communicating with the communication channel 39D and a releasing operation of releasing the pressurizing operation one or more times as the liquid is supplied to the downstream channel. For this reason, even when the check valves 80 stick to the partition wall portion 39 while closing the opening 39E as the liquid is supplied to the downstream channel, the pressure receiving portions 82 receives pressure from the lead-out channel 26 side, causing the pressure receiving portions 82 to bend, and thus the sealing convex portions 84 move along the sealing surface 39B. Thus, a gap can be made between the sealing convex portions 84 and the sealing surfaces 39B. Therefore, the sticking of the check valves 80 can be easily solved.

(2) The control portion 70 performs a combination of a pressurizing operation of pressurizing the second storage portion 25 and the lead-out channel 26 communicating with the communication channel 39D and a releasing operation of releasing the pressurizing operation multiple times or more as the liquid is supplied to the downstream channel. Thus, chances of making a gap between the sealing convex portions 84 and the sealing surfaces 39B can be higher. Therefore, the sticking of the check valves 80 can be more easily solved. In particular, the sticking of the check valves 80 can be more easily solved by adjusting the number of pressurizing operations rather than adjusting the pressure in the pressurizing operation and the operation time of the pressurizing operation.

(3) The check valves 80 are umbrella-type valves in which the diameter of the pressure receiving portions 82 is greater than the diameter of the sealing convex portions 84. Therefore, the openings 39E can be stably opened and closed. Therefore, the liquid can be smoothly supplied from the first storage portion 24 to the second storage portion 25.

(4) The partition wall portion 39 includes the sealing surfaces 39B and the recesses 39C. The sealing surfaces 39B are provided around the openings 39E, and the sealing convex portions 84 can be brought into close contact with the sealing surfaces. The recesses 39C are provided around the sealing surfaces 39B at positions corresponding to at least a part of the outer circumferential edges of the pressure receiving portions 82. For this reason, the sealing convex portions 84 come into close contact with the sealing surfaces 39B, and thus the openings 39E can be stably opened and closed. On the other hand, since the recesses 39C are provided, the area in which the outer circumferential edges of the pressure receiving portions 82 and the sealing convex portions 84 come in close contact with the sealing surfaces 39B can be reduced. Accordingly, the outer circumferential edges of the pressure receiving portions 82 coming into close contact with the sealing surfaces 39B can be suppressed, the pressure receiving portions 82 bend, and the sealing convex portions 84 easily move along the sealing surfaces 39B. Therefore, the sticking of the check valves 80 can be more easily solved.

(5) A plurality of recesses 39C are provided on the sealing surfaces 39B. Therefore, the area in which the outer circumferential edges of the pressure receiving portion 82 and the sealing convex portions 84 are in close contact with the sealing surfaces 39B can be further reduced. Accordingly, the outer circumferential edges of the pressure receiving portions 82 coming into close contact with the sealing surfaces 39B can be suppressed, the pressure receiving portions 82 bend, and the sealing convex portions 84 easily move along the sealing surfaces 39B. Therefore, the sticking of the check valves 80 can be more easily solved.

(6) The sealing surfaces 39B have been subject to texturing. For this reason, the pressure receiving portions 82 bend, and the sealing convex portions 84 easily move along the sealing surfaces 39B. Therefore, the sticking of the check valves 80 can be more easily solved.

(7) When the liquid in the downstream channel is discharged and then supplied again to the downstream channel, the control portion 70 performs the combination of the pressurizing operation and the releasing operation one or more times as the liquid is supplied to the downstream channel. For this reason, even when the check valves 80 stick to the partition wall portion 39 while closing the openings 39E in a case in which the liquid is supplied to the second storage portion 25 again, the pressure receiving portions 82 receive pressure from the lead-out channel 26 side, causing the pressure receiving portions 82 to bend, and thus the sealing convex portions 84 move along the sealing surfaces 39B. Thus, a gap can be made between the sealing convex portions 84 and the sealing surfaces 39B. Therefore, the sticking of the check valves 80 can be easily solved.

Modified Examples

The embodiment can be modified and implemented as follows. The embodiment and the following modified examples can be combined and implemented within a technically consistent range.

In the above-described embodiment, processing of lowering the first liquid level 56 may be performed if the first liquid level 56 is positioned at the full position. For example, the control portion 70 opens the second channel valve 31 to pressurize the inside of the second storage portion 25. Accordingly, the liquid stored in the second storage portion 25 is supplied to the liquid ejection portion 12 through the supply channel 28. Then, a predetermined amount of liquid is discharged from each of the plurality of nozzles 15 in the liquid ejection portion 12. Thereafter, the control portion 70 stops the pressurization by the pressurization portion 46 and opens the inside of the second storage portion 25 to the atmosphere. In such a case, the on-off valve 27 is opened due to the water head difference, and the liquid is supplied from the first storage portion 24 to the second storage portion 25. In this way, the control portion 70 repeatedly performs the processing until the liquid amount sensor 55 no longer detects that the first liquid level 56 is positioned at the full position. Thus, the first liquid level 56 can be lowered.

In the first embodiment, for example, the control portion 70 may not close the second open-to-atmosphere channel 42 when an instruction to select the transport mode is issued, and may close the second open-to-atmosphere channel 42 when an instruction to switch off the power is issued.

In the first embodiment, for example, when an instruction to switch off the power is not issued until a predetermined time elapses in a case in which an instruction to select the transport mode has been issued, the control portion may switch off the power.

In the second embodiment, for example, when an instruction to select the transport mode is issued, the control portion 70 may cause the display 71 to display, as handling information, information prompting the user to remove the liquid container 90 from the mounting portion 23 and then switch off the power.

In the third embodiment, for example, when the power is switched on from the OFF state, the control portion 70 may wait for an instruction from the operator and cause the display portion 71 to display notification information in response to the instruction from the operator. The instruction from the operator may be an instruction to cause the notification information to be displayed or an instruction based on an arbitrary operation. The arbitrary operation includes an operation for performing printing, an operation for performing maintenance of the liquid ejection head 13, and the like.

In the eighth embodiment, the control portion 70 may perform an operation of checking clogging at the first gas-liquid separation membrane 57 and the second gas-liquid separation membrane 64. Specifically, the control portion 70 may pressurize the inside of the first storage portion 24 by controlling the pressurization portion 46, determine to change pressure based on a detection signal from the pressure sensor 47, and perform the operation of check clogging at the first gas-liquid separation membrane 57. The control portion 70 may pressurize the inside of the second storage portion 25 by controlling the pressurization portion 46, determine to change pressure based on a detection signal from the pressure sensor 47, and perform the operation of check clogging at the second gas-liquid separation membrane 64.

In the eighth embodiment, for example, the check valves are not limited to the umbrella valves as long as the valve plate portions 83 and the sealing convex portions 84 are provided therein.

In the eighth embodiment, the control portion 70 may perform the combination of the pressurizing operation of pressurizing the inside of the second storage portion 25 and the releasing operation one or more times, and then perform the combination of the pressurizing operation of pressurizing the inside of the first storage portion 24 and the releasing operation one or more times. In this case, a combination of the pressurizing operation of pressurizing the inside of the first storage portion 24 and the releasing operation may be performed one or more times after a predetermined time elapses after the liquid container 90 is mounted on the mounting portion 23 so that a sufficient amount of liquid is stored in the first storage portion 24 from the liquid container 90.

In the eighth embodiment, the control portion 70 may have each of the supply mechanisms 21 of multiple systems to be subject to the pressurizing operation and the releasing operation. Specifically, the control portion 70 may perform the pressurizing operation and the releasing operation on the supply mechanism 21 corresponding to cyan, and then perform the pressurizing operation and the releasing operation on the supply mechanism 21 corresponding to magenta. In addition, the control portion 70 may then perform the pressurizing operation and the releasing operation on the supply mechanism 21 corresponding to yellow, and then perform the pressurizing operation and the releasing operation on the supply mechanism 21 corresponding to black. In addition, the control portion 70 may have the supply mechanisms 21 of the multiple systems be subject to the pressurizing operation and the releasing operation at once. In this case, an operation time for the releasing operation may be provided, unlike when the supply mechanisms 21 of the multiple systems are divided in a time series manner to be subject to the pressurizing operation and the releasing operation.

Although the shaft portions 81 of the check valves 80 are inserted into any one of the plurality of communication channels 39D and thereby held by the partition wall portion 39 in the eighth embodiment, the disclosure is not limited thereto. For example, the shaft portions 81 of the check valves 80 may not be inserted into the plurality of communication channels 39D but may be inserted into other insertion holes different from the plurality of communication channels 39D to be held by the partition wall portion 39. In addition, for example, one or a plurality of communication channels 39D may be provided.

In the eighth embodiment, the control portion 70 may perform the combination of the pressurizing operation and the releasing operation one or more times before the liquid is supplied to the downstream channel, or may perform the combination of the pressurizing operation and the releasing operation one or more times while the liquid is supplied to the downstream channel. That is, the control portion 70 may perform the combination of the pressurizing operation and the releasing operation one or more times as the liquid is supplied to the downstream channel.

Although the on-off valve operation processing is processing performed by the control portion 70 triggered by closing of a cover member, which is not illustrated, after the liquid container 90 is mounted on the mounting portion 23 in the eighth embodiment, the disclosure is not limited thereto. For example, the on-off valve operation processing may be processing performed by the control portion 70 triggered by closing of another cover member, which is not illustrated. For example, the on-off valve operation processing may be processing performed by the control portion 70 when the liquid amount sensor 55 detects that the first liquid level 56 is positioned at the full position. For example, the on-off valve operation processing may be processing performed by the control portion 70 based on an operation signal from the operation portion 72. That is, the on-off valve operation processing may be processing performed by the control portion 70 when a predetermined performance condition is satisfied as the liquid is supplied to the downstream channel.

Although the first storage portion 24 corresponds to an example of the upstream channel and the second storage portion and the lead-out channel 26 correspond to an example of the downstream channel in the eighth embodiment, the disclosure is not limited thereto. For example, any channels may be used as the upstream channel and the downstream channel as long as they enable the check valves 80 to open and close the openings 39E and communicate with the communication channels 39D. In addition, for example, the upstream channel and the downstream channel may or may not store the liquid as long as the liquid can flow therethrough.

In the eighth embodiment, for example, the first storage portion 24 and the second storage portion 25 may be formed as a single portion.

In the above-described embodiment, for example, when the power is switched on from the OFF state, the control portion may wait for an instruction from the operator and perform the opening operation of opening the second open-to-atmosphere channel 42 in response to the instruction from the operator. The instruction from the operator may be an instruction to perform the opening operation or an instruction based on an arbitrary operation.

In the above-described embodiment, for example, the control portion 70 may perform control to switch from the transport mode to the normal mode with an operation of the operator. That is, the control portion 70 may perform control to switch to at least the transport mode with an operation of the operator.

Although an ink cartridge capable of storing a liquid is adopted as the liquid container 90 in the above-described embodiment, the disclosure is not limited thereto, and for example, an ink tank capable of storing a liquid may be adopted. When an ink tank is adopted as the liquid container 90, the liquid ejection apparatus 11 includes an ink tank that can be replenished with a liquid.

The liquid ejection head 13 may perform printing on a medium by ejecting a liquid in a horizontal posture in which the nozzle surface 14 is horizontal. The liquid ejection head 13 may be provided to change a posture between a horizontal posture and an inclined posture.

The liquid ejection apparatus 11 may separately include a channel through which the first storage portion 24 is open to the atmosphere and a channel through which the first storage portion 24 is pressurized. The liquid ejection apparatus 11 may separately include a channel through which the second storage portion 25 is open to the atmosphere and a channel through which the second storage portion 25 is pressurized.

The pressurization portion 46 may be a diaphragm pump, a piston pump, a gear pump, or the like.

The flexible member 34 may be formed of a rubber membrane, an elastomeric membrane, a film, or the like.

The liquid ejection apparatus 11 may be a liquid ejection apparatus that sprays or ejects a liquid other than ink. States of the liquid ejected from the liquid ejection apparatus in a form of a minute amount of droplet are assumed to include particulate, teardrop, and thread-like tail. A liquid mentioned here may be of any material that can be ejected from the liquid ejection apparatus. For example, the liquid may be any substance in a liquid phase, and is assumed to include a liquid having high or low viscosity, as well as a fluid body such as sol, gel water, other inorganic solvents, an organic solvent, a solution, a liquid resin, a liquid metal, and a molten metal. The liquid is assumed to include not only a liquid as a single state of a substance, but also particles of a functional material made of a solid such as a pigment or metal particles dissolved, dispersed or mixed in a solvent, and the like. Typical examples of the liquid include ink described in the embodiment above, liquid crystal, and the like. Here, ink is assumed to include general water-based and oil-based ink as well as various liquid compositions such as gel ink and hot-melt ink. A specific example of the liquid ejection apparatus includes an apparatus that ejects a liquid containing, in a dispersed or dissolved form, a material such as an electrode material and a color material used in manufacture of liquid crystal displays, electroluminescent displays, surface light-emitting displays, color filters and the like. The liquid ejection apparatus may be an apparatus that ejects bioorganic substances used for manufacturing biochips, an apparatus that is used as a precision pipette and eject a liquid to be a sample, a printing apparatus, a micro dispenser, or the like. The liquid ejection apparatus may be an apparatus that ejects a lubricant to a precision machine such as a timepiece or a camera in a pinpoint manner, or an apparatus that ejects a transparent resin liquid of a ultraviolet curable resin or the like on a substrate for forming a micro-hemispherical lens, an optical lens, and the like used for an optical communication device and the like. The liquid ejection apparatus may be an apparatus that ejects an acidic or an alkaline etching liquid for etching a substrate or the like.

The expression "at least one" used in this specification means "one or more" of desired options. As an example, if the number of options is two, the expression "at least one" used in this specification means only one option or the two options. As an example, if the number of options is three or more, the expression "at least one" used in this specification means only one option or a combination of any two or more options.

Supplementary Note

Hereinafter, technical concepts and effects that are understood from the above-described embodiments and modified examples will be described.

(A) A liquid ejection apparatus may include a first storage portion capable of storing a liquid supplied from a liquid container, a first open-to-atmosphere channel configured to open the inside of the first storage portion to the atmosphere, a first valve capable of opening and closing the first open-to-atmosphere channel, a second storage portion capable of storing the liquid supplied from the first storage portion, a second open-to-atmosphere channel configured to open the inside of the second storage portion to the atmosphere, a second valve capable of opening and closing the second open-to-atmosphere channel, a check valve that permits a flow of the liquid from the first storage portion to the second storage portion and restricts a flow of the liquid from the second storage portion to the first storage portion, and a liquid ejection portion capable of ejecting at least the liquid supplied from the second storage portion, in which a normal mode and a transport mode are selectable, the normal mode is a mode in which power is switched off with the first open-to-atmosphere channel opened by the first valve and the second open-to-atmosphere channel opened by the second valve, and the transport mode is a mode in which power is switched off with the first open-to-atmosphere channel opened by the first valve and the second open-to-atmosphere channel closed by the second valve.

According to this configuration, the second open-to-atmosphere channel can be closed by selecting the transport mode. Thus, even when the liquid is supplied from the first storage portion to the second storage portion due to vibration during transport or the like, the supply of the liquid from the first storage portion to the second storage portion can be stopped by making the pressure inside the second storage portion higher than the pressure inside the first storage portion. Therefore, the liquid being supplied from the first storage portion to the second storage portion due to vibration during transport, or the like can be suppressed.

(B) The liquid ejection apparatus may further include a selection portion capable of selecting the transport mode. In this configuration, the liquid being supplied from the first storage portion to the second storage portion due to vibration during transport, or the like can be suppressed by selecting the transport mode.

(C) The liquid ejection apparatus may further include a control portion and a display portion capable of displaying information, and when the transport mode is selected by the selection portion, the control portion may cause the second valve to close the second open-to-atmosphere channel and cause the display portion to display information that prompts powering off.

In this configuration, when the transport mode is selected, the second open-to-atmosphere channel can be closed and an operator can be given a chance to switch off the power at the timing intended by him or her while making the operator aware of switching off the power. As a result, convenience of the operator can be enhanced.

(D) The liquid ejection apparatus may further include a control portion, and when the transport mode is selected by the selection portion, the control portion may switch off the power after causing the second valve to close the second open-to-atmosphere channel.

In this configuration, when the transport mode is selected, the second open-to-atmosphere channel can be closed and the power can be switched off. As a result, convenience of the operator can be enhanced.

(E) In the liquid ejection apparatus, when the transport mode is selected by the selection portion and then the power is switched on from the OFF state, the control portion may cause the second valve to perform an opening operation of opening the second open-to-atmosphere channel.

In this configuration, even if the second open-to-atmosphere channel 42 is closed when the transport mode is selected and then the power is switched on from the OFF state, the second open-to-atmosphere channel can be opened by performing an opening operation. As a result, convenience of the operator can be enhanced.

(F) The liquid ejection apparatus may further include a switching operation portion with which open and closed states of the second valve are manually switchable.

In this configuration, even when the transport mode is not selected before the power is switched off, the second open-to-atmosphere channel can be closed by manually switching the switching operation portion after the power is switched off without switching on the power from the OFF state again. As a result, convenience of the operator can be enhanced.

(G) The liquid ejection apparatus may further include a detection portion capable of detecting an open or closed state of the second open-to-atmosphere channel. In this configuration, the open or closed state of the second open-to-atmosphere channel can be specified.

(H) The liquid ejection apparatus may further include a control portion and a display portion capable of displaying information, and, in a case in which the detection portion has detected that the second open-to-atmosphere channel is closed when the power is switched on from the OFF state, the control portion may cause the display portion to display information indicating that the second open-to-atmosphere channel is closed.

In this configuration, even if the second open-to-atmosphere channel is closed when the power is switched on from the OFF state, the operator can be made aware of the fact that the second open-to-atmosphere channel is closed. As a result, convenience of the operator can be enhanced.

(I) The liquid ejection apparatus may further include a control portion, and in a case in which the detection portion has detected that the second open-to-atmosphere channel is closed when the power is switched on from the OFF state, the control portion may cause the second valve to perform an opening operation of opening the second open-to-atmosphere channel.

In this configuration, even if the second open-to-atmosphere channel is closed when the power is switched on from the OFF state, the second open-to-atmosphere channel can be opened by performing the opening operation. As a result, convenience of the operator can be enhanced.

(J) The liquid ejection apparatus may further include a control portion, and the control portion may cause the second valve to perform an opening operation of opening the second open-to-atmosphere channel every time the power is switched on from the OFF state.

In this configuration, when the power is switched on from the OFF state, the second open-to-atmosphere channel can be opened regardless of whether the second open-to-atmosphere channel is closed. As a result, convenience of the operator can be enhanced.

What is claimed is:

1. A liquid ejection apparatus comprising:

a first storage portion configured to store a liquid supplied from a liquid container;

a first open-to-atmosphere channel configured to open an inside of the first storage portion to the atmosphere;

a first valve configured to open and close the first open-to-atmosphere channel;

a second storage portion configured to store the liquid supplied from the first storage portion;

a second open-to-atmosphere channel configured to open an inside of the second storage portion to the atmosphere;

a second valve configured to open and close the second open-to-atmosphere channel;

a check valve configured to permit a flow of the liquid from the first storage portion to the second storage portion and restrict a flow of the liquid from the second storage portion to the first storage portion; and a liquid ejection portion configured to eject at least the liquid supplied from the second storage portion, wherein either a normal mode or a transport mode is selectable, the normal mode is a mode in which power is switched off with the first open-to-atmosphere channel opened by the first valve and the second open-to-atmosphere channel opened by the second valve, and the transport mode is a mode in which power is switched off with the first open-to-atmosphere channel opened by the first valve and the second open-to-atmosphere channel closed by the second valve.

2. The liquid ejection apparatus according to claim 1, further comprising a selection portion configured to select the transport mode.

3. The liquid ejection apparatus according to claim 2, further comprising:

a control portion; and a display portion configured to display information, wherein when the transport mode is selected by the selection portion, the control portion causes the second valve to close the second open-to-atmosphere channel and causes the display portion to display information that prompts powering off.

4. The liquid ejection apparatus according to claim 2, further comprising a control portion, wherein when the transport mode is selected by the selection portion, the control portion causes the second valve to close the second open-to-atmosphere channel and then switches off the power.

5. The liquid ejection apparatus according to claim 3, wherein when the transport mode is selected by the selection portion and then the power is switched on from an OFF state, the control portion causes the second valve to perform an opening operation of opening the second open-to-atmosphere channel.

6. The liquid ejection apparatus according to claim 1, further comprising a switching operation portion with which open and closed states of the second valve are manually switchable.

7. The liquid ejection apparatus according to claim 6, further comprising a detection portion configured to detect an open or closed state of the second open-to-atmosphere channel.

8. The liquid ejection apparatus according to claim 6, further comprising a control portion, wherein the control portion causes the second valve to perform an opening operation of opening the second open-to-atmosphere channel every time the power is switched on from an OFF state.

9. The liquid ejection apparatus according to claim 7, further comprising:

a control portion; and a display portion configured to display information, wherein in a case in which the detection portion detects that the second open-to-atmosphere channel is closed when the power is switched on from an OFF state, the control portion causes the display portion to display information indicating that the second open-to-atmosphere channel is closed.

10. The liquid ejection apparatus according to claim 7, further comprising a control portion, wherein in a case in which the detection portion detects that the second open-to-atmosphere channel is closed when the power is switched on from an OFF state, the control portion causes the second valve to perform an opening operation of opening the second open-to-atmosphere channel.

* * * * *